US012278390B2

(12) United States Patent
Bell

(10) Patent No.: US 12,278,390 B2
(45) Date of Patent: Apr. 15, 2025

(54) PRESSURE RELEASE VENT FOR BATTERY MODULE

(71) Applicant: Caterpillar Inc., Peoria, IL (US)

(72) Inventor: Brian R. Bell, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 290 days.

(21) Appl. No.: 17/591,882

(22) Filed: Feb. 3, 2022

(65) Prior Publication Data

US 2023/0246288 A1  Aug. 3, 2023

(51) Int. Cl.
*H01M 50/35* (2021.01)
*H01M 50/271* (2021.01)
*H01M 50/618* (2021.01)

(52) U.S. Cl.
CPC ......... *H01M 50/35* (2021.01); *H01M 50/271* (2021.01); *H01M 50/618* (2021.01)

(58) Field of Classification Search
CPC ... H01M 50/35; H01M 50/271; H01M 50/618
See application file for complete search history.

(56) References Cited

U.S. PATENT DOCUMENTS

| 10,950,831 | B2 | 3/2021 | Singer et al. | |
|---|---|---|---|---|
| 2011/0020684 | A1* | 1/2011 | Liang | H01M 50/209 |
| | | | | 429/100 |
| 2013/0059181 | A1* | 3/2013 | LePort | H01M 50/167 |
| | | | | 29/623.2 |
| 2015/0064514 | A1* | 3/2015 | Wu | H01M 50/293 |
| | | | | 429/120 |
| 2015/0280191 | A1* | 10/2015 | Matsudo | H01M 50/103 |
| | | | | 429/56 |
| 2019/0203845 | A1* | 7/2019 | Tomasko | F16K 17/162 |
| 2019/0386273 | A1* | 12/2019 | Pflueger | H01M 10/6567 |
| 2021/0043901 | A1 | 2/2021 | Li et al. | |
| 2021/0050573 | A1 | 2/2021 | Lee | |

FOREIGN PATENT DOCUMENTS

| CN | 110323380 | | 10/2019 |
|---|---|---|---|
| CN | 111416082 | A | 7/2020 |
| CN | 211980738 | | 11/2020 |
| CN | 213278312 | | 5/2021 |
| CN | 215266473 | U | 12/2021 |

* cited by examiner

*Primary Examiner* — Milton I Cano
*Assistant Examiner* — Albert Michael Hilton

(57) ABSTRACT

A battery module has battery cells and a housing. The housing includes a first end plate, a second end plate, a first side plate, and a second side plate. The battery cells are disposed between the first end plate, the second end plate, the first side plate, and the second side plate. A cover is disposed at least partially over the first end plate, the second end plate, the first side plate, and the second side plate. A pressure release vent couples to the housing and includes an interior surface that defines a plurality of sections that are configured to dislodge from the pressure release vent based on a pressure within the battery module exceeding a pressure threshold. The individual sections pivot about segments during rupture of the pressure release vent.

6 Claims, 17 Drawing Sheets

PRESSURE RELEASE VENT FOR BATTERY MODULE

TECHNICAL DESCRIPTION

The present disclosure relates to an apparatus for relieving pressure within a battery module, and more particularly, to an apparatus that includes troughs that are configured to fail to relieve pressure from within the battery module.

BACKGROUND

Battery modules are used in a variety of applications in order to provide and store energy. For example, battery modules are increasingly implemented in vehicles, equipment, and other machines. When implemented in mobile applications, battery modules are often stored such that the battery modules minimize impact on cabin space, storage space, or other space for needed for critical components of a machine. In such instances, the battery modules include battery cells that are tightly packed together in close proximity, within a housing or other frame of the battery module. The battery cells may also be environmentally sealed within the battery module to limit impacts of debris, fluids, and the like.

Given the sealing of the battery cells within the battery module, some battery modules include pressure relief components (e.g., valves, membranes, etc.) that vent pressures within the battery module under certain conditions. For example, in the event that one or more of the battery cell fail, the failing battery cell may release a relatively large volume of gas in a relatively short period of time, thereby causing a rapid pressure increase within the sealed battery module. Such a failure may be referred to as a "runaway" event in which the temperature of the failing battery also increases rapidly. The sudden increase in battery module pressure during such a runaway event may cause harm to other battery module components if not safely released.

An example of relieving pressure within a battery module is described in, for example, Chinese Patent Application No. CN211980738 (hereinafter, the "'738 reference"). For example, the '738 reference describes an explosion-proof valve disposed on a battery pack housing. The explosion-proof valve is used for exhausting and releasing pressure of the battery pack, and a controller connected to the explosion-proof valve is configured to control operation of the valve. For example, the '738 reference explains that when the pressure in the battery pack reaches a bursting pressure, the controller causes the valve to open. However, the inclusion of a controller to relieve pressure within the battery pack complicates the system described in the '738 reference, and results in added costs. The use of a dedicated controller for operating the disclosed valve may also introduce potential points of failure during thermal runaway of the battery module. For example, the controller, sensors, and the like that are used to control the explosion-proof valve may be prone to error, and/or may increase an amount of time to open the explosion-proof valve to relieve pressure.

Examples of the present disclosure are directed toward overcoming the deficiencies described above.

SUMMARY

According to a first aspect, a battery module includes a housing having a first end plate defining a first end of the battery module. The first end plate has a passage. The housing further has a second end plate defining a second end of the battery module opposite the first end, a first side plate coupled to the first end plate and the second end plate, and a second side plate opposite the first side plate, the second side plate being coupled to the first end plate and the second end plate. A plurality of battery cells are secured within the housing between the first end plate, the second end plate, the first side plate, and the second side plate. A cover surrounds the plurality of battery cells, and forms a first substantially fluid-tight seal with the first end plate and a second substantially fluid-tight seal with the second end plate. A gas-impermeable pressure release vent couples to the first end plate and forms a third substantially fluid-tight seal with the first end plate. The gas-impermeable pressure release vent includes a body having a pocket substantially overlaying the passage. The pocket of the body includes a first portion having a first thickness and a second portion adjacent to the first portion, the second portion having a second thickness less than the first thickness.

According to a further aspect, an apparatus is configured to couple to a structure containing battery cells, the apparatus includes a body having a front having an exterior surface, and a back having an interior surface that is opposite the exterior surface. A sidewall is formed by the interior surface and extends from the back in a direction towards the front. A plurality of sections are formed by the interior surface. A plurality of segments are included, where individual segments of the plurality of segments extend from individual sections of the plurality of sections to the sidewall. A first trough is formed by the interior surface, where the first trough is disposed between individual sections of the plurality of sections. A second trough is formed by the interior surface, where the second trough at least partially encircles the plurality of sections.

According to a further aspect, a housing includes a first end plate, a second end plate disposed opposite the first end plate, a first side plate extending from the first end plate to the second end plate, a second side plate disposed opposite the first side plate and extending from the first end plate to the second end plate, and a cover disposed at least partially over the first end plate, at least partially over the second end plate, the first side plate, and the second side plate. A gas-permeable pressure relief valve couples to the first end plate. A gas-impermeable pressure release vent, separate from the gas-permeable pressure relief valve, couples to the first end plate. The gas-impermeable pressure release vent forms a seal with the first end plate. The gas-impermeable pressure release vent includes a first portion having a first thickness, and a second portion adjacent to the first portion, the second portion having a second thickness less than the first thickness.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Wherever possible, the same reference numbers will be used throughout the drawings to refer to the same or like parts.

Figure 1:
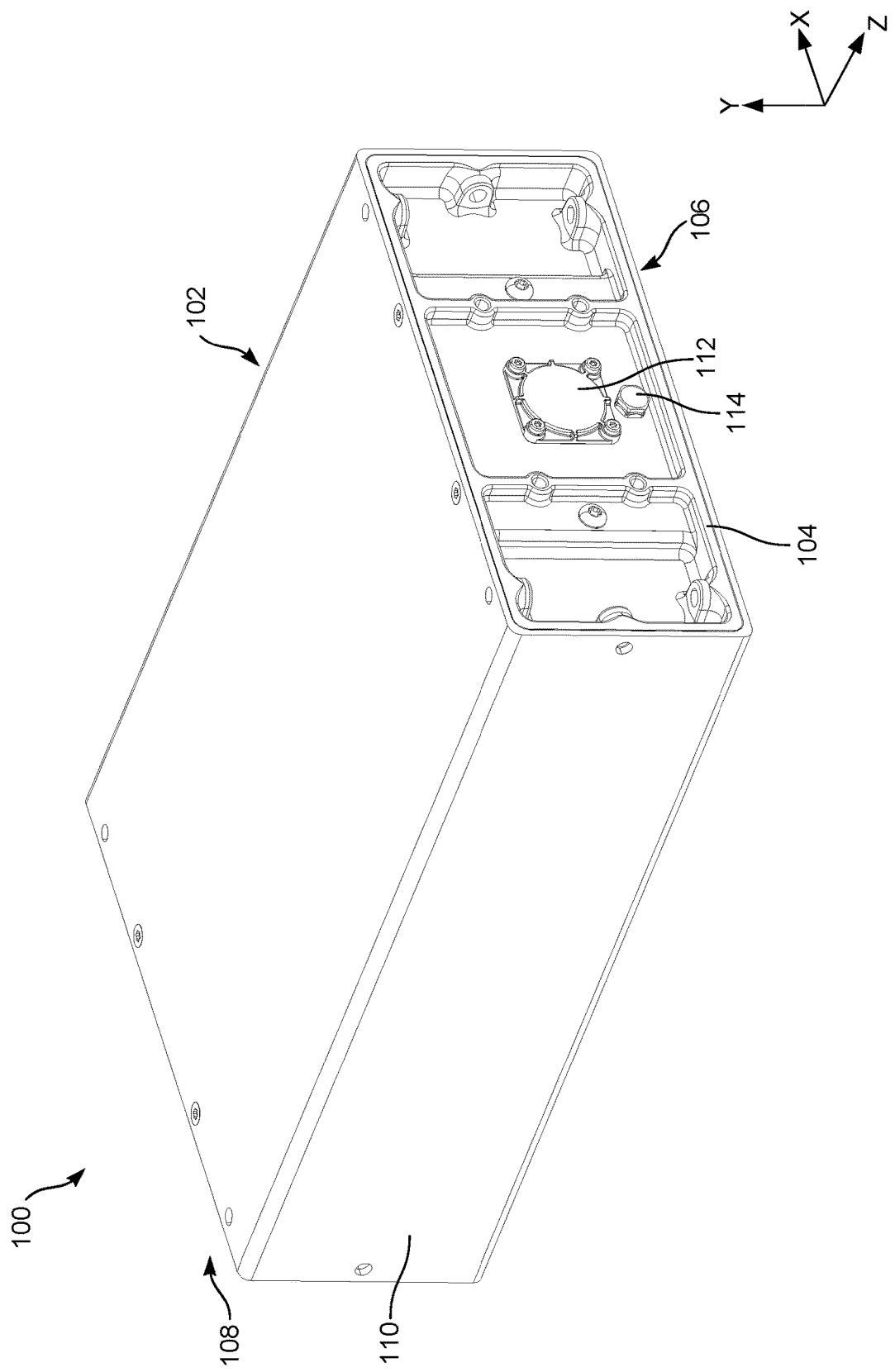
FIG. 1 illustrates a first perspective view of an example battery module, having an example pressure release vent for exhausting gases within the battery module, according to an example of the present disclosure.

FIG. 1 illustrates a first perspective view of an example battery module 100. Generally, the battery module 100 supplies electrical power to a machine, vehicle, piece of equipment, and the like to which the battery module 100 is electrically coupled. In some instances, the view shown in FIG. 1 may represent a front view of the battery module 100.

The battery module 100 includes a housing 102. In some instances, the housing 102 includes a first end plate 104 that defines a first end 106 of the battery module 100, and a second end plate (discussed below with reference to FIG. 2) that defines a second end 108 of the battery module 100 (opposite the first end 106 and spaced apart in the Z-direction). The housing 102 further includes a cover 110 that couples to the first end plate 104. The first end plate 104 and the cover 110 couple to define an interior cavity, compartment, and the like of the battery module 100. As discussed herein in FIGS. 4-8, battery cells are disposed within the interior cavity of the battery module 100. In some instances, the cover 110 is disposed around the battery cells, (e.g., about the Z-axis) so as to enclose sides (e.g., lateral sides) of the battery module 100 (or the interior cavity), while the first end plate 104 and the second end plate couple to the cover 110 to enclose ends of the battery module 100 (or the interior cavity).

The battery module 100 includes a pressure release vent 112. In some instances, the pressure release vent 112 couples to the first end plate 104 (e.g., fasteners). The pressure release vent 112 is configured to prevent unnecessary damage to one or more components of the battery module 100 and/or other harmful effects in the case of a runaway event or battery cell failure. For example, the pressure release vent 112 is configured to vent an internal pressure within the battery module 100 (e.g., within an interior cavity) in case of a failure of one or more battery cell(s). During such failure, gases from one or more of the battery cell(s) vent into the interior cavity of the battery module 100. Chemical reactions within the battery module 100 generate extreme amounts of heat (thermal runaway) and give off gas. As a result of the rapidly rising internal pressure, the pressure release vent 112 ruptures and enables the battery module 100 to depressurize.

This depressurization prevents a rupture or failure of the battery module 100 itself (e.g., the first end plate 104, the cover 110, the second end plate, etc.) that carries the risk of injury or significant damage. The pressure release vent 112 is configured to fail at pressures in excess of a pressure threshold, generally much higher than atmospheric pressures. In this sense, the pressure release vent 112 represents a weak point in the battery module 100 that is configured to fail first, prior to other components of the battery module 100, such as the housing 102, when a certain pressure threshold is reached. Prior to failure, however, the pressure release vent 112 may be impermeable to gases and/or other fluids so as to enclose or seal the battery module 100. In some instances, the pressure release vent 112 may be configured to rupture when pressures within the battery module 100 exceed between approximately 20 or approximately 30 PSI. However, as will be discussed herein with regard to FIGS. 14 and 17, the pressure release vent 112 may be configured to fail at certain pressures based on a size of the pressure release vent 112 (e.g., X-direction), a thickness of the pressure release vent 112 (e.g., Z-direction), a material of the pressure release vent 112 (e.g., tensile strength), and so forth. The pressure release vent 112 may represent a structure formed from a single piece of material (e.g., injection molded).

In some instances, the pressure release vent 112 is configured to vent the internal pressure in an outward direction, away from the housing 102. For example, in situations in which pressure within the sealed housing 102 exceeds the example pressures noted above, the pressure release vent 112 ruptures in an outward direction (e.g., in the Z-direction), away from the housing 102, to expel gases and/or fluids from within the housing 102. In some instances, the first end 106 of the battery module 100 is positioned adjacent to compartments, frames, shields, and the like of a machine in which the battery module 100 is installed. In the case of a rupture of the pressure release vent 112, the exhausted gases and/or potential shrapnel, chards, or pieces of the pressure release vent 112 may avoid damage to other components of the machine and/or other harmful effects. In some instances, the pressure release vent 112 is manufactured from composites, plastics, rubbers, and/or combinations thereof.

Figure 7:
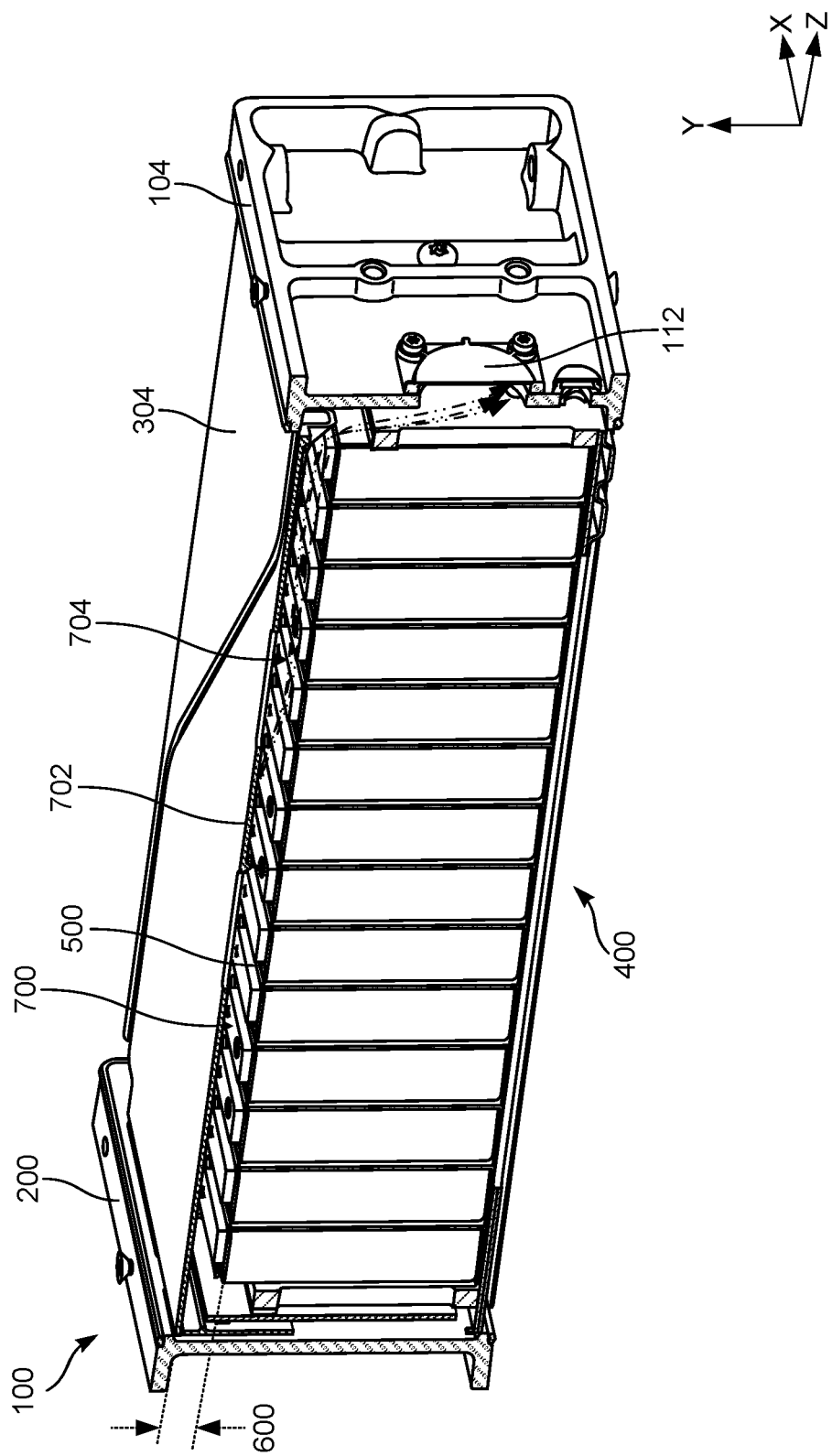
FIG. 7 illustrates a first cross-sectional view of the battery module of FIG. 1, showing a plurality of battery cells secured within the battery module, and a space interposed between the plurality of battery cells and a top plate of the battery module to assist in creating a flow path to the pressure release vent, according to an example of the present disclosure.
Figure 8:
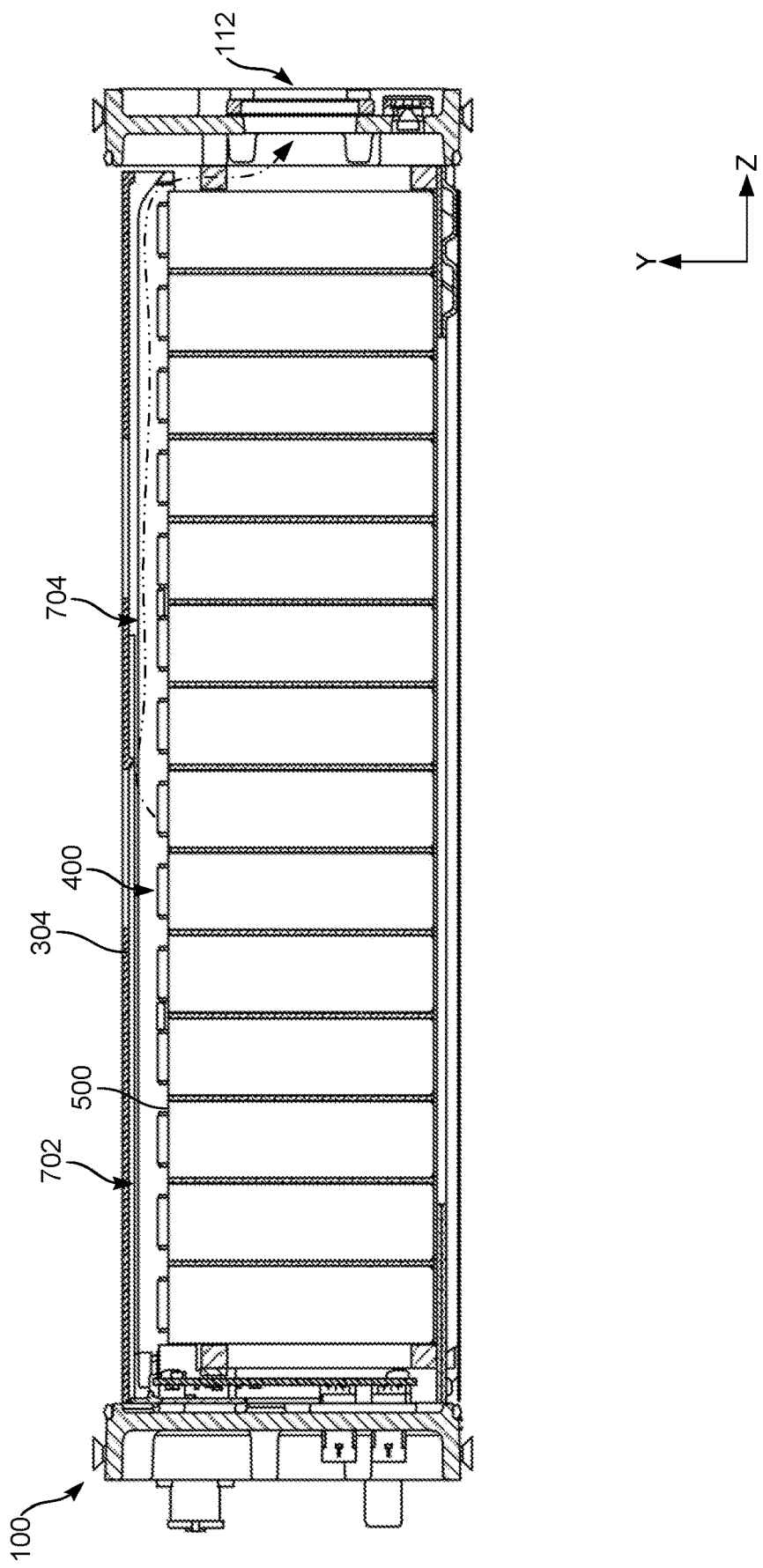
FIG. 8 illustrates a second cross-sectional view of the battery module of FIG. 1, showing a plurality of battery cells secured within the battery module, and a space interposed between the plurality of battery cells and a top plate of the battery module to assist in creating a flow path to the pressure release vent, according to an example of the present disclosure.

Moreover, as will be further discussed herein in more detail with regard to FIGS. 7 and 8, the gases released by the battery cell(s) during failure are routed, directed, or otherwise channeled to the pressure release vent 112 due to the structural configuration of the housing 102 and the battery cells disposed therein. The battery module 100, or the interior cavity of the battery module 100, creates a flow path that directs the gases within the interior cavity to the pressure release vent 112. As such, regardless of which battery cell within the battery module 100 fails, or the number of battery cells that fail, the gases are routed to the location at which the pressure release vent 112 is disposed such that the pressure release vent 112 releases the pressure within the battery module 100. Further, as will be explained herein, the first end plate 104, the second end plate, and the cover 110 are sealed together, respectively, such that the gases are routed to the pressure release vent 112. In some instances, the gases are routed between a lower surface of the cover 110 and the upper surfaces of the battery cells and compressible materials that are disposed between adjacent battery cells.

In some instances, the battery module 100 may additionally or alternatively include a pressure equalization vent 114 that is configured to enable pressure equalization between the interior cavity of the battery module 100 and an environment of the battery module 100. In particular, the pressure equalization vent 114 is configured to be permeable to gases but impermeable to liquids, such as water. Additionally, the pressure equalization vent 114 may be a bidirectional vent that enables a high internal pressure of the battery module 100 to be vented to atmosphere and for a low internal pressure of the battery module 100 to be relieved by the atmosphere. In some instances, the pressure equalization vent 114 may be manufactured from a polymeric material, plastic material, polytetrafluoroethylene, or similar material that enables gases to be transferred without transferring liquids. For example, if a change in altitude results in a pressure differential across the pressure equalization vent 114, the pressure equalization vent 114 may cause the internal pressure to equilibrate with the environment. Although the pressure equalization vent 114 is shown on the first end plate 104, with the pressure release vent 112, the pressure equalization vent 114 may be disposed on the opposite end plate.

The battery module 100, or components thereof, such as the housing 102, may be made of aluminum, steel, composites, plastics, and/or any other suitable material. In some examples, multiple battery modules, which include similar housings and battery cells, are electrically coupled to one another to provide a desired power output and voltage output for the machine. As such, although one battery module 100 is shown in FIG. 1, multiple battery modules may be electrically coupled together and in a stacked relationship to provide a desired amount of power to the machine.

The battery module 100 is therefore composed of a plurality of battery cells that provide electrical power to a machine, or components thereof (e.g., steering, hydraulics, etc.). The battery module 100 includes the housing 102 that houses and protects the battery cells. The housing 102 also provides a sealed environment of the battery module 100 in which the battery cells reside. The pressure release vent 112 is configured to safely vent an internal pressure of the battery module 100, exhausting gases and/or other fluids within the battery module 100, in the case of a failure of one or more of the battery cells.

Figure 2:
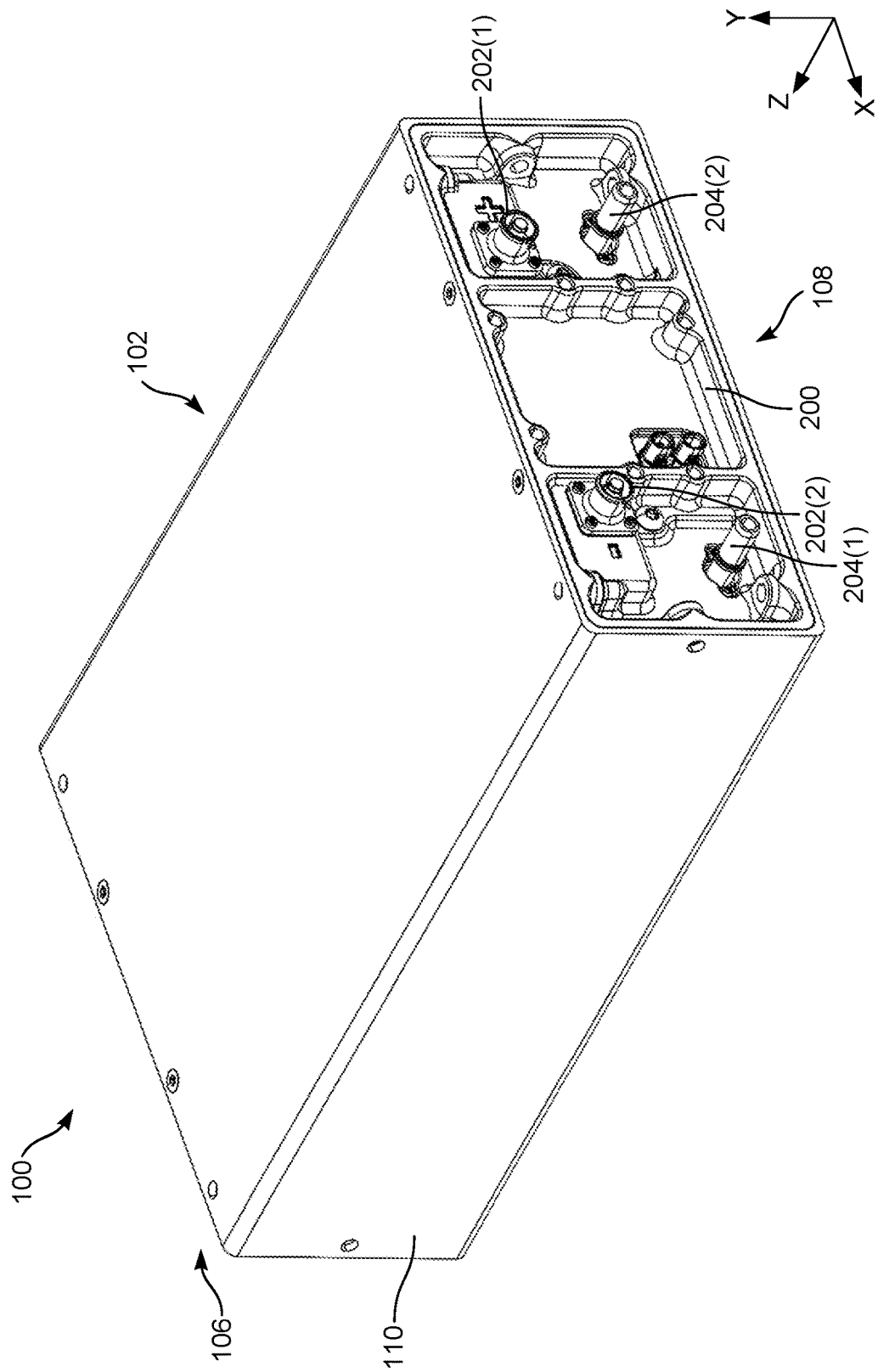
FIG. 2 illustrates a second perspective view of the battery module of FIG. 1, according to an example of the present disclosure.

FIG. 2 illustrates a second perspective view of the battery module 100. In some instances, the view shown in FIG. 2 may represent a rear view of the battery module 100. As shown in FIG. 2, an example housing 102 includes a second end plate 200 that defines the second end 108 of the battery module 100. In some instances, the second end plate 200 is identical in size to the first end plate 104. The second end plate 200 is spaced apart from the first end plate 104 by a distance (e.g., in the Z-direction) that corresponds to a length of the battery module 100 (e.g., in the Z-direction). In some instances, the distance may be determined based on a number of battery cells residing within the housing 102 and/or the battery module 100, a size (e.g., width, height, etc.) of the battery cells themselves, and so forth. In some instances, the first end plate 104 and the second end plate 200 are arranged parallel to one another. Further, the second end plate 200 couples to the cover 110 to enclose the battery module 100 (or the interior cavity).

The second end plate 200 includes, or accommodates, terminals 202 (or other components) that extend from within the battery module 100 to one or more components outside of the housing 102. For example, a first terminal 202(1) may represent a positive terminal of the battery module 100, and a second terminal 202(2) may represent a negative terminal of the battery module 100. The first terminal 202(1) and the second terminal 202(2) are electrically coupled to the battery cells, within the battery module 100, via flex circuits, busbars, and the like. The first terminal 202(1) and the second terminal 202(2) provide electrical contacts configured to connect the battery module 100 to other battery modules, a motor, control circuitry, or other components of a machine.

The second end plate 200 may additionally include, or accommodate, connectors 204 that extend from within the battery module 100 to one or more components outside of the battery module 100. For example, a first connector 204(1) may enable coolant to be provided into the battery module 100 for cooling the battery cells, while a second connector 204(2) may enable coolant to be removed from within the battery module 100. The coolant may be distributed throughout internal channels a cooling plates within the housing 102 and/or the battery module 100 to cool the battery module 100 (e.g., via a pump). Additionally, or alternatively, the battery module 100 may include heating pad(s) that heat the battery cells. Additional details of heating, cooling, or otherwise controlling a temperature of a battery module, battery cells, and the like are described in, for example, U.S. patent application Ser. No. 17/337,193, filed Jun. 2, 2021, and entitled "Sealed Battery Module with Cooling and Heating," the entirety of which is herein incorporated by reference.

In some instances, the terminals 202 and the connectors 204 are located on the second end 108 of the battery module 100, opposite the first end 106, such that in the event of a rupture of the pressure release vent 112, wires, tubes, conduits and the like that couple to the terminals 202 and the connectors 204, respectively, are not damaged. Such damage, for example, may be imparted by hot gases released from within the battery module 100 and/or pieces of the pressure release vent 112 that rupture and project away from the battery module 100.

The second end plate 200 therefore serves to at least partially enclose the battery module 100 to protect and seal the battery cells within the battery module 100. Such sealing directs an internal pressure and/or gases to the pressure release vent 112 at the first end 106. This, in turn, prevents damage to the terminals 202 and the connectors 204 at the second end 108 in the case of a failure of the pressure release vent 112.

Figure 3:
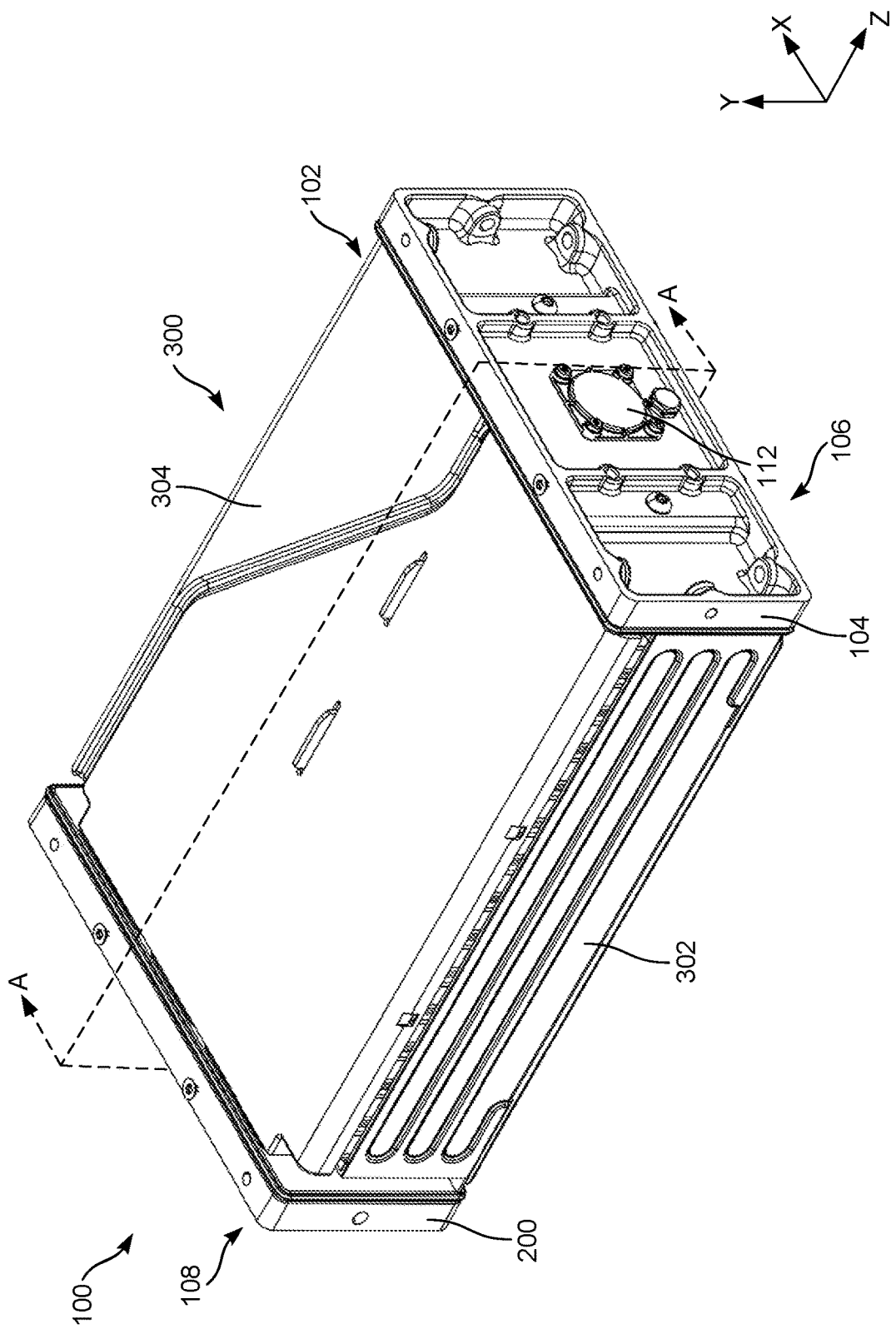
FIG. 3 illustrates a perspective view of the battery module of FIG. 1, showing a cover of the battery module removed to illustrate an example top plate of the battery module that resides vertically above battery cells of the battery module, according to an example of the present disclosure.

FIG. 3 illustrates a perspective view of the battery module 100, showing the cover 110 removed from the housing 102. Removing the cover 110 exposes an interior cavity 300 of the battery module 100. As introduced above, the interior cavity 300 may be defined or sealed when the first end plate 104, the cover 110, and the second end plate 200 couple to one another, respectively.

In addition to the first end plate 104, the cover 110, and the second end plate 200, the housing 102 includes one or more side plates 302. The side plates 302 extend from the first end plate 104 to the second end plate 200 (e.g., in the Z-direction) to define respective sides of the housing 102. In some instances, a first of the side plates 302 couples to the first end plate 104 at the first end 106, and couples to the second end plate 200 at the second end 108. Additionally, a second of the side plates 302 couples to the first end plate 104 at the first end 106, and couples to the second end plate 200 at the second end 108. The first of the side plates 302 and the second of the side plates 302 are spaced apart from one another (e.g., in the X-direction). In doing so, the side plates 302 span a distance between the first end plate 104 and the second end plate 200. The cover 110 may couple to the side plates 302 as well, respectively. Additionally, the first end plate 104, the second end plate 200, and the side plates 302 are coupled to one another to define an exterior perimeter of the housing 102. The battery cells reside within the exterior perimeter.

The battery module 100 may further include a top plate 304. In some examples, the top plate 304 covers at least a portion of the battery cells that reside within the housing 102. In this sense, the top plate 304 is disposed vertically over or above (e.g., Y-direction) a top of the battery cells. The top plate 304 may be made from a non-conductive material such as plastic, rubber, polymer, or any other suitable non-conductive material. As discussed herein with regard to FIGS. 7 and 8, the top plate 304 assists in channeling gases released from the battery cells to the pressure release vent 112. For example, a surface of the top plate 304 disposed opposite and facing the top surfaces of the battery cells 400 (e.g., the top 500) may define at least part of a flow path for the gases to reach the pressure release vent 112.

The side plates 302 of the housing 102 therefore serve to house the battery cells of the battery module 100. The side plates 302 assist in retaining the battery cells within the battery module 100 to prevent movement, shifting, and the like during use. Further, the top plate 304 resides vertically above the battery cells to direct gases released from the battery cells to the pressure release vent 112 in the case of a failure of the one or more battery cells.

Figure 4:
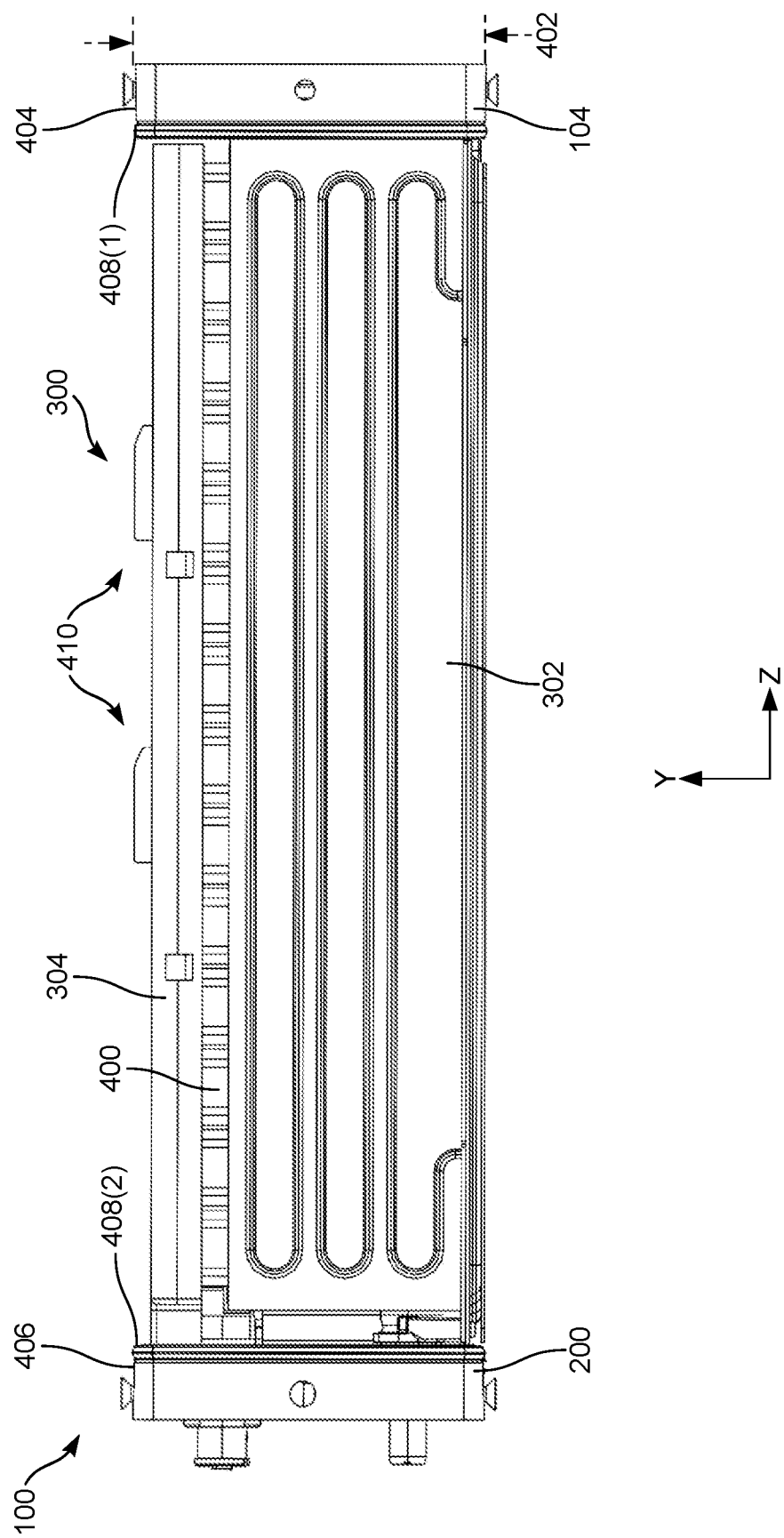
FIG. 4 illustrates a side view of the battery module of FIG. 1, showing a cover of the battery module removed to illustrate an example top plate of the battery module that resides vertically above battery cells of the battery module, according to an example of the present disclosure.

FIG. 4 illustrates a side view the battery module 100, showing the cover 110 removed. As introduced above, the first end plate 104, the second end plate 200, and the one or more side plates 302 enclose battery cells 400 within the battery module 100. The battery cells 400 are shown residing within an exterior perimeter formed by the first end plate 104, the second end plate 200, and the one or more side plates 302. In some instances, the first end plate 104, the second end plate 200, and the one or more side plates 302 secure the battery cells 400 within the battery module 100 to prevent the battery cells 400 from moving. As will be discussed in more detail in FIG. 5, the battery cells 400 may be arranged in a stacked relationship relative to another, end to end, along a length (e.g., Z-direction) and/or width (e.g., X-direction) of the battery module 100.

The first end plate 104 and the second end plate 200 include a height 402 (Y-direction). The top plate 304 is shown being disposed vertically beneath (e.g., Y-direction) a first top 404 of the first end plate 104 and vertically beneath (e.g., Y-direction) a second top 406 of the second end plate 200. In doing so, the top plate 304 resides within the height 402 of the first end plate 104 and the second end plate 200, vertically beneath the first top 404 of the first end plate 104 and the second top 406 of the second end plate 200. As such, the cover 110 couples to the first end plate 104 and the second end plate 200 without interference from the top plate 304. As also shown, the top plate 304 resides vertically above (e.g., Y-direction) the battery cells 400 for providing a flow path to the pressure release vent 112 at the first end 106.

The cover 110 may be fluidly sealed to the housing 102 via one or more seals 408. For example, a first seal 408(1) may be disposed between an inner surface of the cover 110 and the first end plate 104, while a second seal 408(2) may be disposed between an inner surface of the cover 110 and the second end plate 200. The first seal 408(1) may extend around a perimeter of the first end plate 104(1), while the second seal 408(2) may extend around a perimeter of the second end plate 200(2) (e.g., in the Y and X-directions). The first seal 408(1) and the second seal 408(2) form a substantially continuous fluid-tight seal between the cover 110 and the housing 102 to prevent ingress and egress of fluids into and out of the battery module 100 (e.g., between the cover 110 and the first end plate 104, between the cover and the second end plate 200, etc.). Accordingly, the cover 110 is fluidly sealed to the housing 102 to substantially isolate the interior cavity 300 such that the battery module 100 is able to remain sealed. In some instances, the seals 408 represent a gasket, o-ring, or other sealing component.

The battery module 100 may include tabs 410. The tabs 410 may be sized such that the tabs 410 extend above a height of the battery cells 400. In some examples, when the cover 110 couples to the housing 102, the tabs 410 prevent the cover 110 contacting or otherwise damaging the battery cells 400 if a downward force is exerted on the cover 110 and/or the top plate 304. For example, the tabs 410 may engage the inner surface of the cover 110 to prevent the cover 110 compressing towards the battery cells (e.g., in the Y-direction). The top plate 304 includes apertures, passages, channels, and the like through which the tabs 410 are disposed (e.g., for contacting the cover 110).

The first end plate 104, the second end plate 200, and the side plates 302 therefore enclose and secure the battery cells 400 within the battery module 100. The housing 102 provides the interior cavity 300 in which the battery cells 400 reside, and the top plate 304 serves to direct gases released by the battery cells 400 to the pressure release vent 112. Additionally, the sealing of the cover 110 to the first end plate 104 and the second end plate 200, via the first seal 408(1) and the second seal 408(2), respectively, prevents a release of the gases at locations other than the pressure release vent 112.

Figure 5:
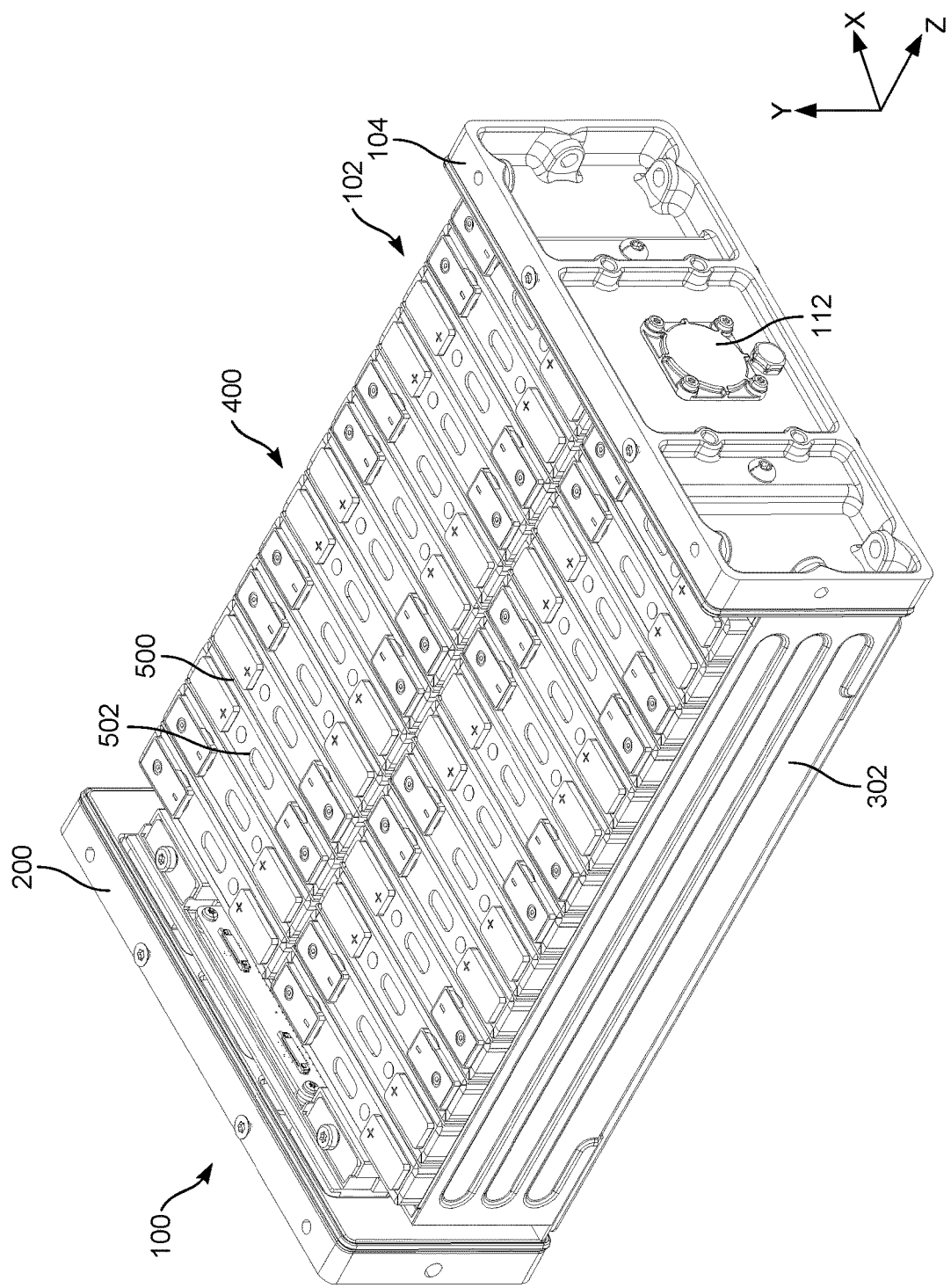
FIG. 5 illustrates a perspective view of the battery module of FIG. 1, showing a plurality of battery cells secured within the battery module, according to an example of the present disclosure.

FIG. 5 illustrates the battery module 100, showing the cover 110 and the top plate 304 removed to illustrate the battery cells 400 residing within the housing 102. As introduced above, the housing 102 (e.g., the first end plate 104, the second end plate 200, the one or more side plates 302) secures the battery cells 400 within the battery module 100. Within the housing 102, the battery cells 400 are electrically connected to one another in order to form the battery module 100.

Generally, the battery module 100 and the one or more battery cells 400 are contemplated as utilizing lithium ion battery technology to store electrical power and distribute the stored electrical power at a battery module voltage and a battery module amperage. The power distribution and power storage characteristics of the battery module 100 may be defined at least in part on the configurations of the one or more battery cells 400 included in the battery module 100. In other instances, the battery module 100 may embody any other type of battery technology that converts chemical energy directly to electrical energy by utilizing a difference in bond energies of the compounds utilized in the construction of the battery module 100. The battery cells 400 may include any capacity, voltage, energy, etc.

In some instances, the battery cells 400 are divided equally between two halves (e.g., sections, portions, zones, areas, etc.) of the battery module 100. For example, fourteen battery cells 400 may be disposed on a first half or side of the battery module 100, while fourteen battery cells 400 may be disposed on a second half or side of the battery module 100. However, the battery module 100 (or the housing 102) is not limited to securing twenty eight battery cells 400, and more than or less than twenty eight battery cells 400 may be included within the battery module 100. Additionally, the battery cells 400 may be arranged in parallel, in series, and/or in groups of the battery cells 400, wherein the battery cells 400 within a group can be in series (or in parallel) while the groups are in parallel (or in series).

The battery cells 400 may be secured within the battery module 100, such as within the housing 102, via compression, adhesives, fasteners, and/or any combination thereof. For example, in some instances, the battery cells 400 may be compressed between the first end plate 104 and the second end plate 200 (e.g., in the Z-direction), and between the one or more side plates 302 (e.g., in the X-direction). In some instances, a compressible material is disposed in between adjacent battery cells 400. For example, the compressible material may be made of foam, plastic, rubber, polymer, or any other suitable compressible non-conductive material. Here, the compressible material is disposed between individual adjacent battery cells 400 of the battery cells 400. In some instances, during manufacturing of the battery module 100, the compressible material may be at least partially compressed or otherwise deformed. While the compressible material is compressed, the battery cells 400 are inserted into the housing 102 or encased within the housing 102. The compressible material creates a secure, tight fit of the battery cells 400 within the housing 102. Therein, the first end plate 104, the second end plate 200, and the side plates 302 resist the compressible material expanding such that the compressible material remains under a compressive load within the first end plate 104, the second end plate 200, and the side plates 302. Examples of compressing battery cells together within a housing is described in, for example, U.S. patent application Ser. No. 17/246,151, filed Apr. 30, 2021, and entitled "Housing for Securing Battery Cells in a Battery Module," the entirety of which is herein incorporated by reference.

One or more busbars span between the battery cells 400 to contact terminals on the battery cells 400, respectively. The terminals of the battery cells 400 may be disposed on a top 500 of the individual battery cells 400. The busbars are formed from a conductive material, such as a metal, and are coupled or otherwise in electrical connection with terminals on the battery cells 400.

In some instances, the top 500 of the battery cells 400 include a vent 502 that releases pressure within the battery cells 400 when a pressure within the battery cells 400 exceeds a predetermined amount. In this sense, the battery cells 400 may be configured to release a pressure within the battery cells 400 at the top 500, as compared to a bottom or sides of the respective battery cells 400. Such control of pressure (and gases) from the battery cells 400 may prevent damage to additional battery cells 400 within the battery module 100. For example, if the vent 502 was alternatively located on a side of the battery cell 400, for example, the release of pressure may be into the side of another (e.g., adjacent) battery cell 400. Such release of gases, however, may damage the other battery cell 400. Additionally, by locating the vent on the top 500 of the battery cells 400, the gases within the battery cells 400 are routed by the top plate 304 to the pressure release vent 112. That is, gases released by the battery cells 400 follow a flow path located above the top 500 of the battery cells 400, and to the pressure release vent 112.

In some instances, one or more inner end plates may assist in maintaining a compressed state of the battery cells 400 (e.g., in the Z-direction). For example, a first inner end plate may reside between the first end plate 104 and the battery cells 400, and/or a second inner end plate may reside between the second end plate 200 and the battery cells 400. The first inner end plate and the second inner end plate may couple to the side plates 302 to contain the battery cells 400 therein.

The housing 102 of the battery module 100 provides a reinforced structure capable of supporting the battery cells 400. Within the battery module 100, the battery cells 400 are arranged such that in the event of a release of gases from the battery cells 400, the gases are routed to the pressure release vent 112. In some instances, the top plate 304 assists in routing the gases to the pressure release vent 112 to ensure a safe discharge of gases from within the battery module 100.

Figure 6:
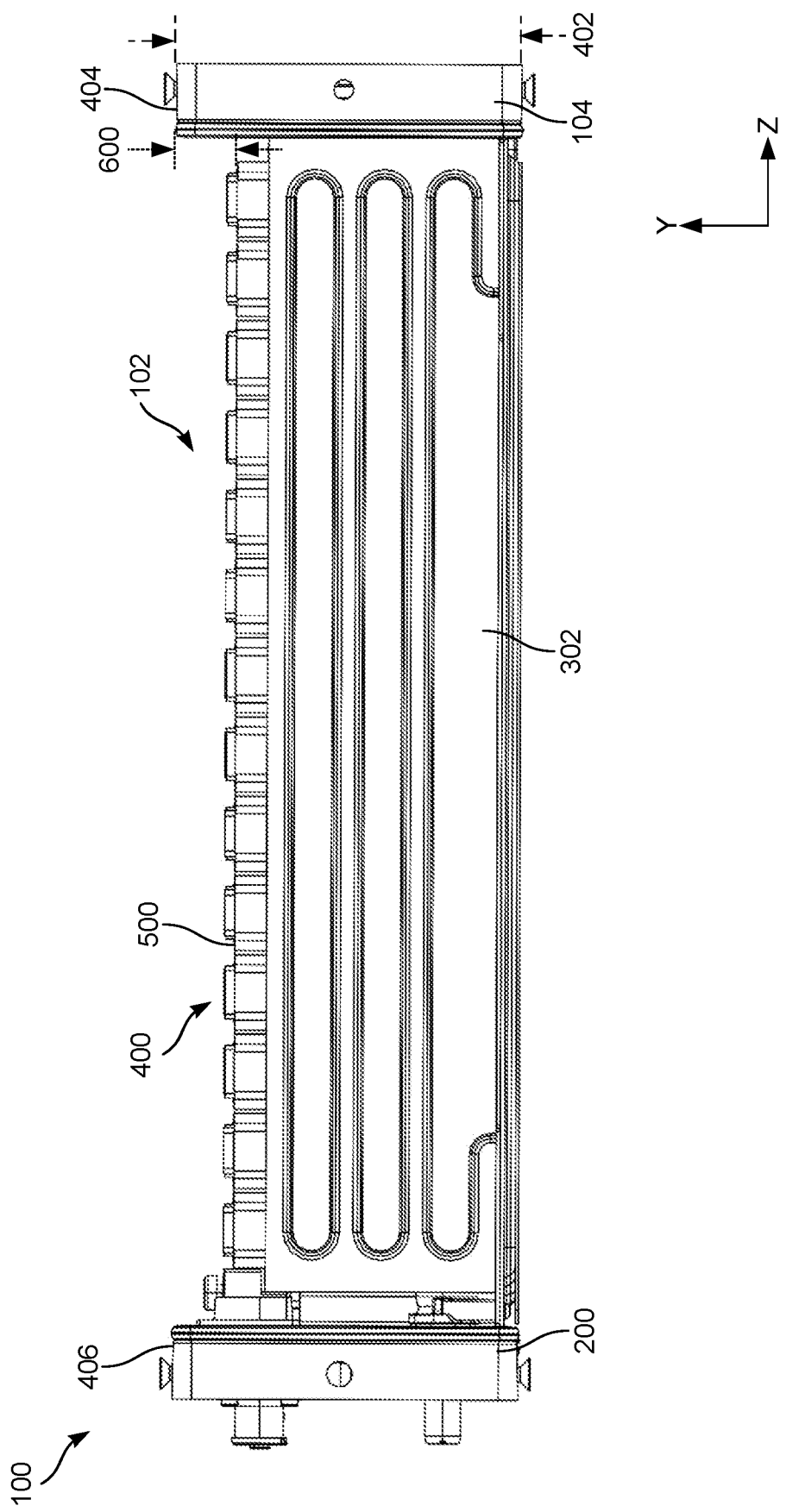
FIG. 6 illustrates a side view of the battery module of FIG. 1, showing a plurality of battery cells secured within the battery module, according to an example of the present disclosure.

FIG. 6 illustrates a side view of the battery cells 400 residing within the housing 102. In FIG. 6, the cover 110 and the top plate 304 are shown removed (e.g., decoupled) from the housing 102.

As introduced above, the first end plate 104 and the second end plate 200 include the height 402 (Y-direction). A height of the battery cells 400 may be less than the height 402 of the first end plate 104 and the second end plate 200. In doing so, the battery cells 400 reside vertically beneath the first top 404 of the first end plate 104 and the second top 406 of the second end plate 200. A gap 600 extends from the top 500 of the battery cells 400, to the first top 404 of the first end plate 104 and the second top 406 of the second end plate 200, respectively. Within the gap 600, the top plate 304 (e.g., FIG. 3) resides to channel gases exhausted by the battery cells 400 to the pressure release vent 112. The top plate 304 therefore resides over the tops 500 of the respective battery cells 400, such that in the event of a release of gases from the battery cells 400, such as out the vent 502, the gases are routed to the pressure release vent 112. In such instances, the top plate 304 spans a length between the first end plate 104 and the second end plate 200, and a width between the side plates 302.

In some instances, the battery cells 400 are sandwiched within the housing 102 such that the release of gases is directed vertically upward (e.g., in the Y-direction). However, gases may be released from the battery cells 400 at other locations (e.g., front, side, back, etc.). In such instances, the gases rise within the battery module 100 (e.g., in the Y-direction) for channeling by the top plate 304 towards the pressure release vent 112. In this manner, the top plate 304 helps to confine the gases within the battery module 100.

FIG. 7 illustrates a cross-sectional perspective view of the battery module 100, taken along plane A-A of FIG. 3. In FIG. 7, the cover 110 is shown removed from the battery module 100. The top plate 304 is shown residing vertically above (e.g., in the Y-direction) the top 500 of the battery cells 400. For example, the top plate 304 resides within the gap 600 between the first end plate 104 and the battery cells 400, as well as between the second end plate 200 and the battery cells 400.

As shown, a chamber 700 is located between an interior surface 702 of the top plate 304 and the top 500 of the battery cells 400. The chamber 700 may accumulate gases exhausted from the battery cells 400 (e.g., via the vent 502) and channel the gases in a direction towards the pressure release vent 112. For example, in the event of gases being released by the battery cells 400, the gases may be contained within the chamber 700 (which coincides with a portion of the gap 600). The containment of the gases within the chamber 700, by the top plate 304, provides a flow path 704 for the gases in a direction towards the pressure release vent 112 (as compared to accumulating and/or dispersing to other locations within the battery module 100). In doing so, the top plate 304 assists in providing the flow path 704 to safely release internal pressure from the battery cells 400 of the battery module 100.

FIG. 8 illustrates a cross-sectional side view of the battery module 100, taken along plane A-A of FIG. 3. In FIG. 8, the cover 110 is shown removed from the battery module 100. The top plate 304 is shown residing vertically above (e.g., in the Y-direction) the top 500 of the battery cells 400 to define the chamber 700. The chamber 700 accumulates gases exhausted from the battery cells 400 and channel the gases in a direction towards the pressure release vent 112. For example, the top plate 304 may assist in defining the flow path 704 for the gases in a direction towards the pressure release vent 112.

Additionally, the cover 110 is sealed against fluids permeating the battery module 100, damaging the battery module 100, and/or preventing operation of the battery module 100. By isolating and sealing the individual battery modules from one another, the battery modules are combined to satisfy power demands of a machine. However, by isolating the battery modules, operation of a machine is maintained even if a single battery module fails or is deactivated.

Figure 9:
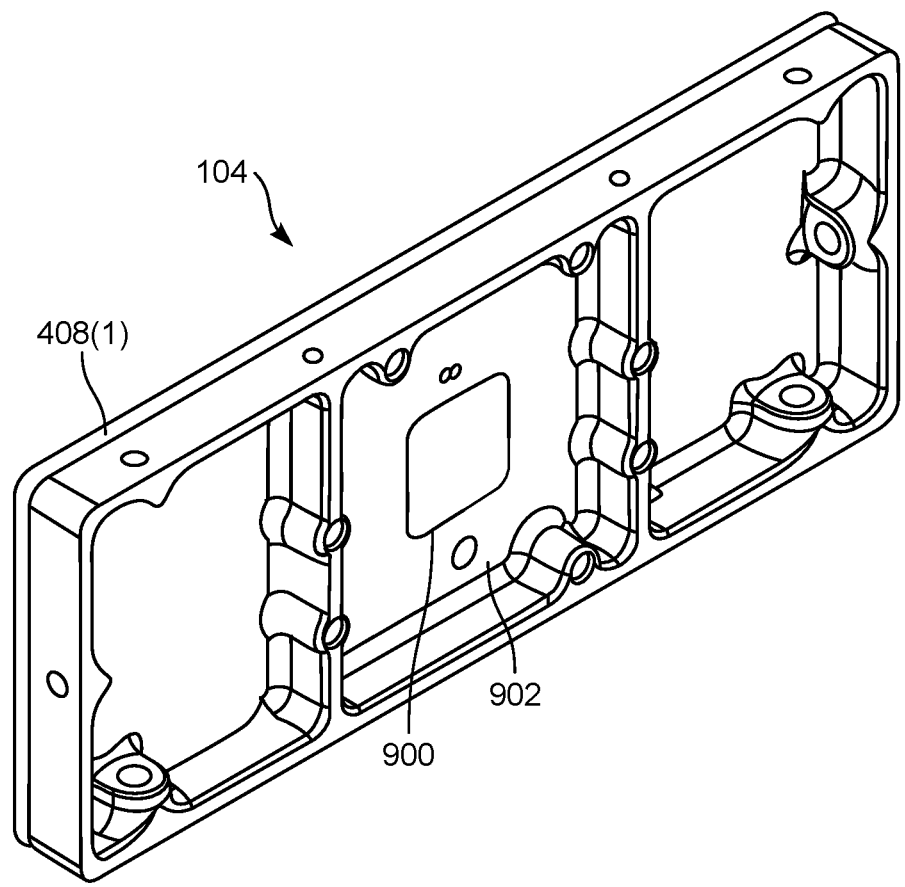
FIG. 9 illustrates a perspective view of an example end plate of a housing of the battery module of FIG. 1, according to an embodiment of the present disclosure.
Figure 9:
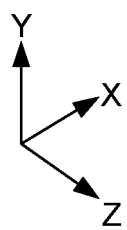

FIG. 9 illustrates the first end plate 104 of the housing 102. As discussed above, the first end plate 104 includes the first seal 408(1) that is configured to form a substantially fluid-tight seal between the cover 110 and the first end plate 104. More specifically, the first seal 408(1) extends around a perimeter of an outer surface 902 of the first end plate 104.

A passage 900 extends through a thickness or body of the first end plate 104 (Z-direction). The passage 900 is sized to accommodate the pressure release vent 112. For example, as discussed in more detail herein with regard to FIGS. 10-17, the pressure release vent 112 includes an interior surface that adjoints to the outer surface 902 of the first end plate 104. A shape of the passage 900 corresponds to the shape of the pressure release vent 112 (e.g., circular, square, rectangular, etc.). The passage 900 fluidly connects the internal pressure formed within the interior cavity 300 of the battery module 100 to the pressure release vent 112 such that the pressure release vent 112 ruptures upon the internal pressure of the battery module 100 exceeding a pressure threshold during a thermal runaway of the battery cells 400.

Figure 10:
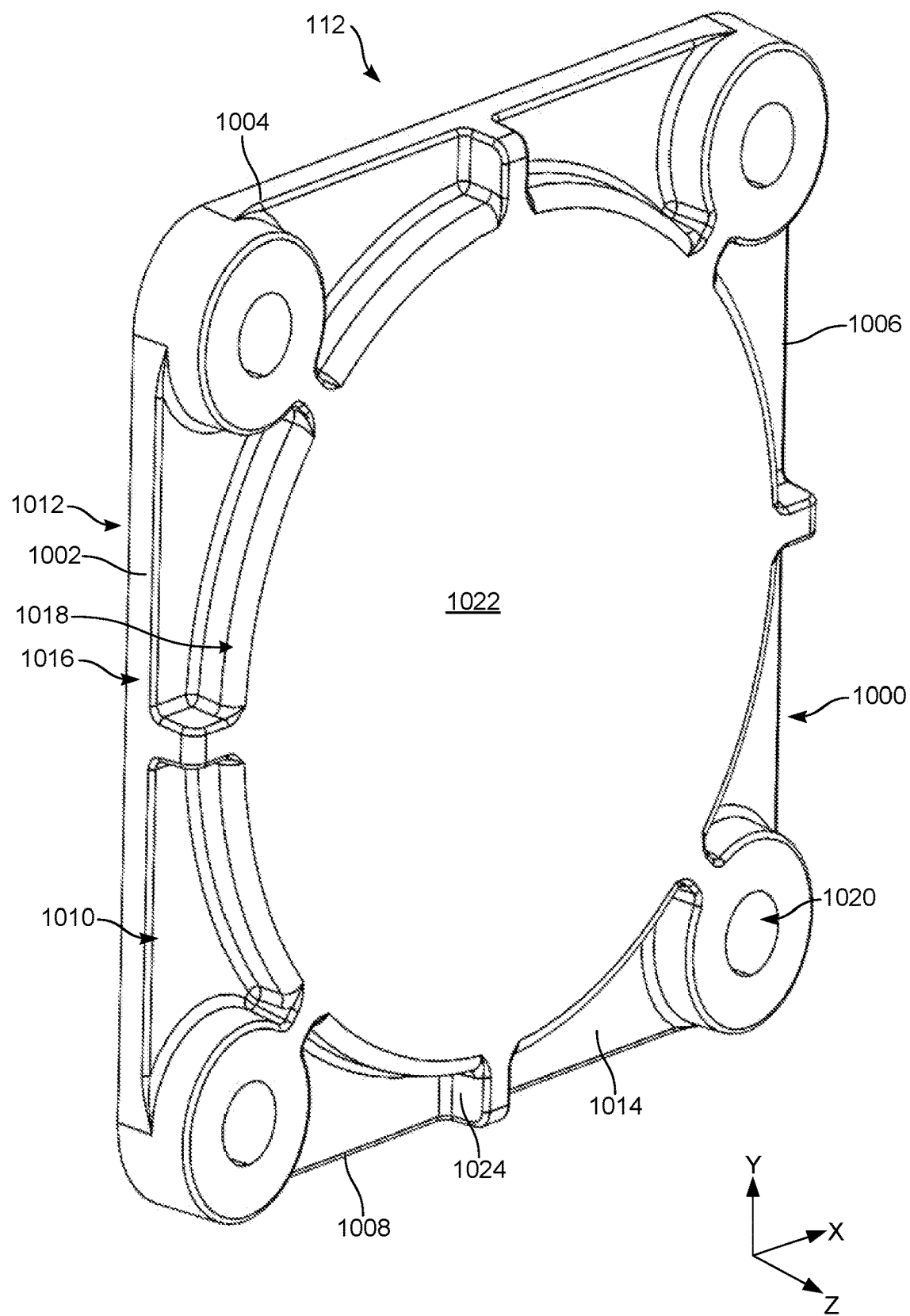
FIG. 10 illustrates a first perspective view of the pressure release vent of the battery module of FIG. 1, according to an example of the present disclosure.

FIG. 10 illustrates a perspective view of the pressure release vent 112. In some instances, the view illustrated in FIG. 10 represents a front view of the pressure release vent 112.

The pressure release vent 112 is defined by a body 1000. The body 1000 represents a single unibody structure formed from, or by, a single piece of material. The body 1000 may include a first side 1002, a second side 1004, a third side 1006, and a fourth side 1008. Additionally, the body 1000 may include a front 1010 and a back 1012 that is opposite the front 1010 (e.g., spaced apart in the Z-direction). The front 1010 includes an exterior surface 1014. The exterior surface 1014 is exposed external to the battery module 100 when the pressure release vent 112 couples to the first end plate 104. As discussed herein with relation to FIG. 11, the back 1012 or an interior surface (opposite the exterior surface 1014) couples to the first end plate 104 and is exposed to the interior cavity 300 of the battery module 100. For example, the back 1012 may couple to the first end plate 104, around the passage 900, to expose the pressure release vent 112 to the internal pressures formed within the battery module 100.

In some instances, the body 1000 includes, or is formed by, a flange portion 1016 and a protruded portion 1018 that extends from the flange portion 1016. The exterior surface 1014 of the pressure release vent 112 is continuous between the flange portion 1016 and the protruded portion 1018. The flange portion 1016 includes openings 1020 that extend through a thickness of the body 1000 (e.g., in the Z-direction), from the front 1010 to the back 1012. The openings 1020 receive fasteners that couple the pressure release vent 112 to the first end plate 104. For example, fasteners may be disposed through the openings 1020 for coupling the pressure release vent 112 to the first end plate 104. In some instances, the openings 1020 are disposed at corners of the pressure release vent 112. In some instances, more than or less than four openings 1020 are used to secure the pressure release vent 112 to the first end plate 104. Adhesives or other gaskets may assist in sealing the pressure release vent 112 to the first end plate 104. The flange portion 1016 therefore represents part of the body 1000 of the pressure release vent 112 that is secured to the first end plate 104.

The protruded portion 1018 defines a region 1022 of the pressure release vent 112 that is configured to breach, fail, or rupture in instances where a pressure within the battery module 100 exceeds a pressure threshold, such as during a failure of one or more of the battery cells 400. For example, in the event that one or more of the battery cells 400 releases gases into the battery module 100, and the pressure builds up to a pressure that exceeds the pressure threshold, the region 1022 may rupture in a direction outwards (e.g., in the Z-direction) and away from the battery module 100. In some instances, and as shown, the region 1022 may include a circular shape. In some instances, one or more ribs 1024 provide support to the region 1022 to control rupture of the region 1022 in the direction outwards and away from the battery module 100. As shown, the region 1022 represents a substantially planar area of the exterior surface 1014.

As discussed herein in relation to FIGS. 11, 14, 16, and 17, portions of the region 1022 include a thickness that is less than a thickness of other portions of the pressure release vent 112. As such, the region 1022 of the pressure release vent 112 is configured to rupture in the event of a pressure within the battery module 100 exceeding a threshold pressure, as compared to other portions of the pressure release vent 112 (e.g., sides) and/or other portions of the battery module 100.

In some instances, the pressure release vent 112 may be manufactured from composites, plastics, rubber, and/or any combination thereof. The pressure release vent 112 may represent a continuous piece of material formed from a single unibody structure. The pressure release vent 112 may be manufactured from a plurality of manufacturing techniques, such as injection molding, 3D printing, additive manufacturing, blow molding, and so forth.

The pressure release vent 112 is therefore configured to couple to the first end plate 104. The pressure release vent 112 is configured to rupture in the event that a pressure within the battery module 100 exceeds a pressure threshold. Rupture of the pressure release vent 112, and particularly, the region 1022, prevents further damage to the battery module 100, other components of a machine that are in proximity to the battery module 100, and/or other harmful effects.

Figure 11:
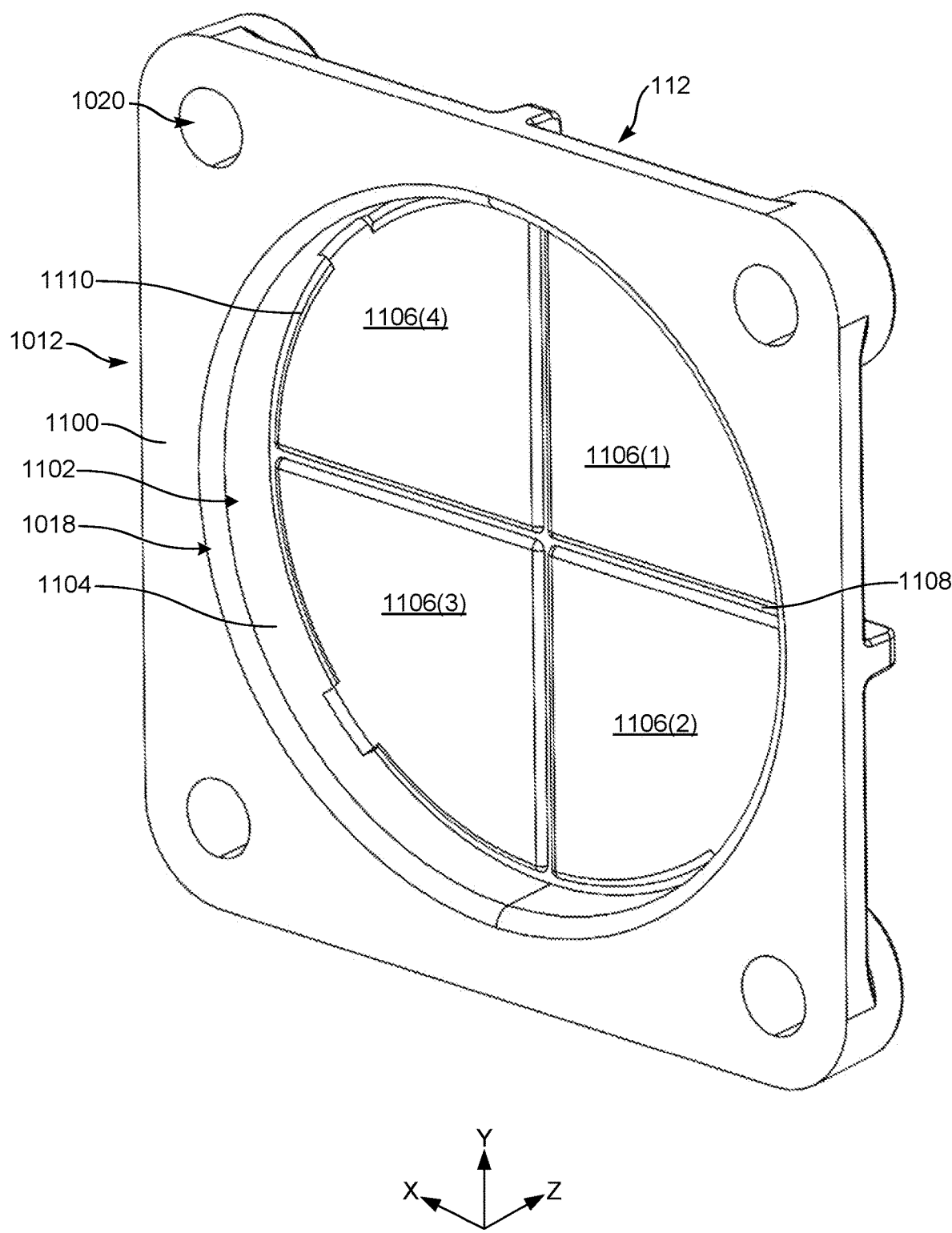
FIG. 11 illustrates a second perspective view of the pressure release vent of the battery module of FIG. 1, according to an example of the present disclosure.

FIG. 11 illustrates a perspective view of the pressure release vent 112. In some instances, the view illustrated in FIG. 11 represents a rear view of the pressure release vent 112. For example, an interior surface 1100 of the back 1012 is configured to mount the first end plate 104. The interior surface 1100 may be continuous between the flange portion 1016 and the protruded portion 1018 of the pressure release vent 112. The openings 1020 are shown for coupling the pressure release vent 112 to the first end plate 104 (e.g., via fasteners disposed through the openings 1020). In such instances, the flange portion 1016 of the pressure release vent 112 is configured to couple to the first end plate 104.

The pressure release vent 112 includes a pocket 1102 that is defined by the protruded portion 1018. In some instances, the pocket 1102 is formed within, or by, the interior surface 1100 of pressure release vent 112. The pocket 1102 is also shown being formed on the back 1012 of the pressure release vent 112. In some instances, the pocket 1102 extends in a direction away from the back 1012 of the pressure release vent 112 (e.g., into the pressure release vent 112, in the Z-direction). In some instances, the pocket 1102 is defined by a sidewall 1104 extends from the back 1012 or the interior surface 1100. The sidewall 1104 at least partially disposes the region 1022 in a direction away from the flange portion 1016 on the front 1010 of the pressure release vent 112.

The pocket 1102 is configured to route, channel, or otherwise direct the gases outwards from the battery module 100. For example, in the event of a rupture of the pressure release vent 112, the sidewall 1104 may assist in funneling the gases out of the battery module 100. The pocket 1102 is further shown including a plurality of sections 1106, such as a first section 1106(1), a second section 1106(2), a third section 1106(3), and a fourth section 1106(4). The sections 1106 represent flaps, segments, or parts of the pressure release vent 112 that rupture. The sections 1106 are disposed on, or within, the interior surface 1100, opposite a location of the region 1022, on the exterior surface 1014. The sections 1106 are shown being similar in size and shape. For example, the sections 1106 may represent quadrants that rupture. However, although four sections 1106 are shown, more than four sections 1106 may be included. Additionally, the sections 1106 may be dissimilar in shape and/or size with regard to one another.

Figure 14:
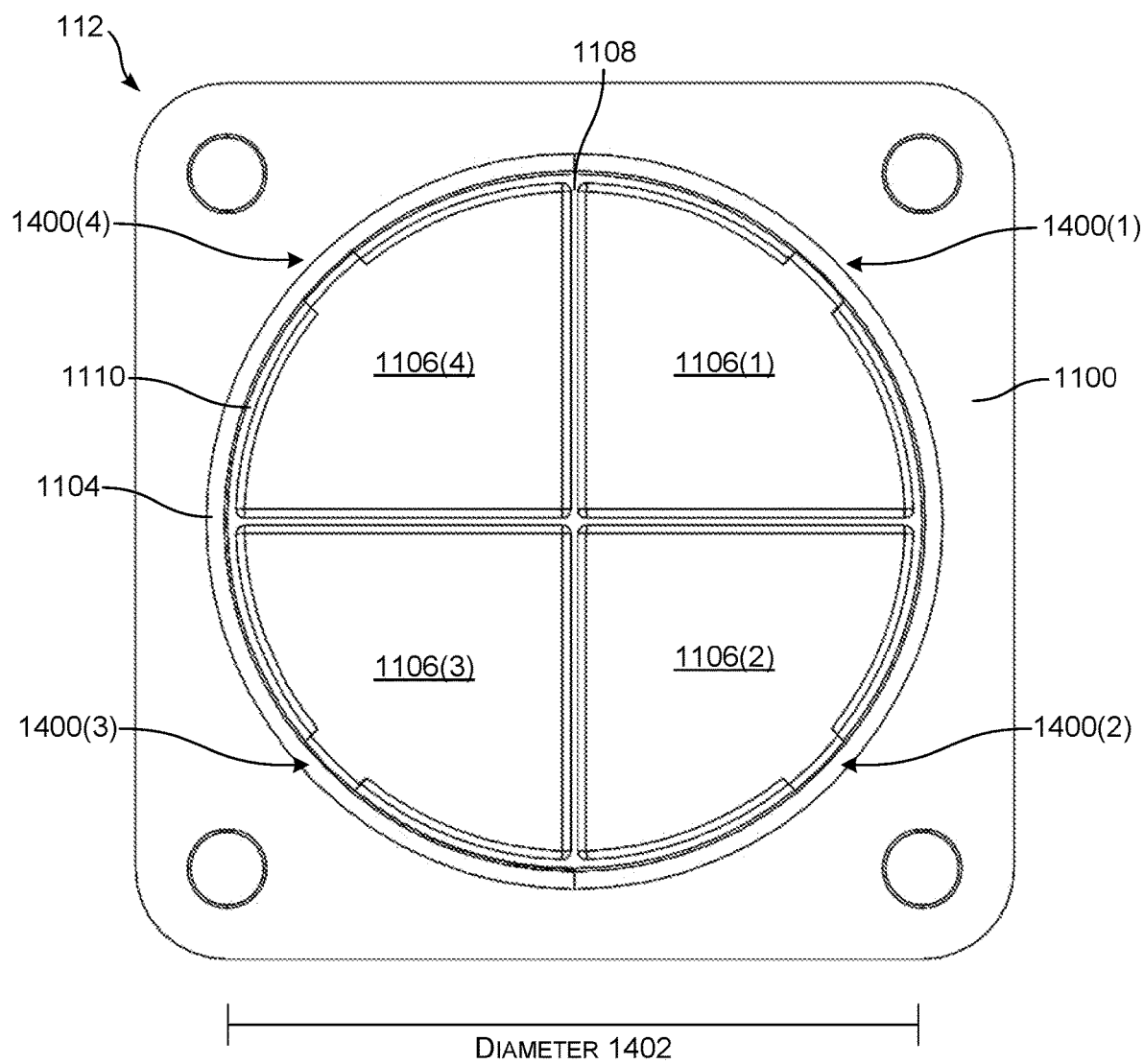
FIG. 14 illustrates a third side view of the pressure release vent of the battery module of FIG. 1, according to an example of the present disclosure.
Figure 14:
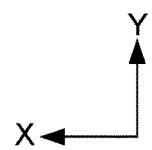

As discussed in more detail with regard to FIG. 14, the sections 1106 are separated from one another by a first groove, channel, furrow, or trough 1108. The first trough 1108 bisects or is disposed between the sections 1106. The first trough 1108 includes a thickness that is less than a thickness of the sections 1106 (e.g., in the Z-direction). In doing so, the first trough 1108 may breach (e.g., rip, sever, etc.) in the event that the pressure within the battery module 100 exceeds the pressure threshold. That is, the first trough 1108 represents a weak point of the pocket 1102 (or the region 1022) that is designed to breach. Additionally, in some instances, each of the sections 1106 couple (e.g., adjoined) to the sidewall 1104 via a segment. As also discussed in more detail in FIG. 14, the segments provide a pivot or rotational point for the sections 1106, respectively, during rupture of the pressure release vent 112. For example, by pivoting the sections 1106 about the segment, which are located around a perimeter of the pocket 1102, the sections 1106 open outward in a direction away from the battery module 100. Such movement may control a rupture of the pressure release vent 112

A second groove, channel, furrow, or trough 1110 is shown being disposed around the sections 1106. The second trough 1110 may assist in allowing the sections 1106 to pivot about the segment, respectively. For example, the second trough 1110 may include a thickness that is less than a thickness of the sections 1106 (e.g., in the Z-direction). During rupture of the pressure release vent 112, the thickness of the second trough 1110 may assist in permitting the section 1106 to pivot about the segments, respectively. Here too, in some instances, the second trough 1110 may breach (e.g., rip, sever, etc.) such that the sections may pivot about the segment. In other instances, the lessened thickness of the second trough 1110, as compared to the thickness of the sections 1106, permits the sections 1106 to bend, rotate, open and the like for relieving the internal pressure within the battery module 100.

In some instances, the pressure release vent 112 may be sealed to the first end plate 104 to create a gas-impermeable seal. For example, a gasket may be placed between the pressure release vent 112 and the outer surface 902 of the first end plate 104. More particularly, the gasket may be reside adjacent to the interior surface 1100, such that upon coupling the pressure release vent 112 to the first end plate 104, the gasket may be interposed between the first end plate 104 and the pressure release vent 112. In such instances, the gasket may include a similar profile, contour, and/or shape as the flange portion 1016, with cutout(s) for accommodate the openings 1020 (and the fasteners disposed through the openings 1020), as well as the pocket 1102. Additionally, or alternatively, sealants, such as room temperature vulcanizing (RTV) silicone, may be used to provide the gas-impermeable seal between the first end plate 104 and the pressure release vent 112. Here, the sealants may be applied to the interior surface 1100, such as along the flange portion 1016, and/or the exterior surface 1014.

The pressure release vent 112 therefore includes the pocket 1102 for directing the internal pressure outside the battery module 100. The pocket 1102 includes the sections 1106 that are designed and configured to rupture. The first trough 1108 and the second trough 1110 assist in controlling the rupture of the sections 1106, or more generally, the pressure release vent 112. For example, the segments provide a pivot point about which the sections 1106 pivot during rupture of the sections 1106 given that the segments may have an increased thickness.

Figure 12:
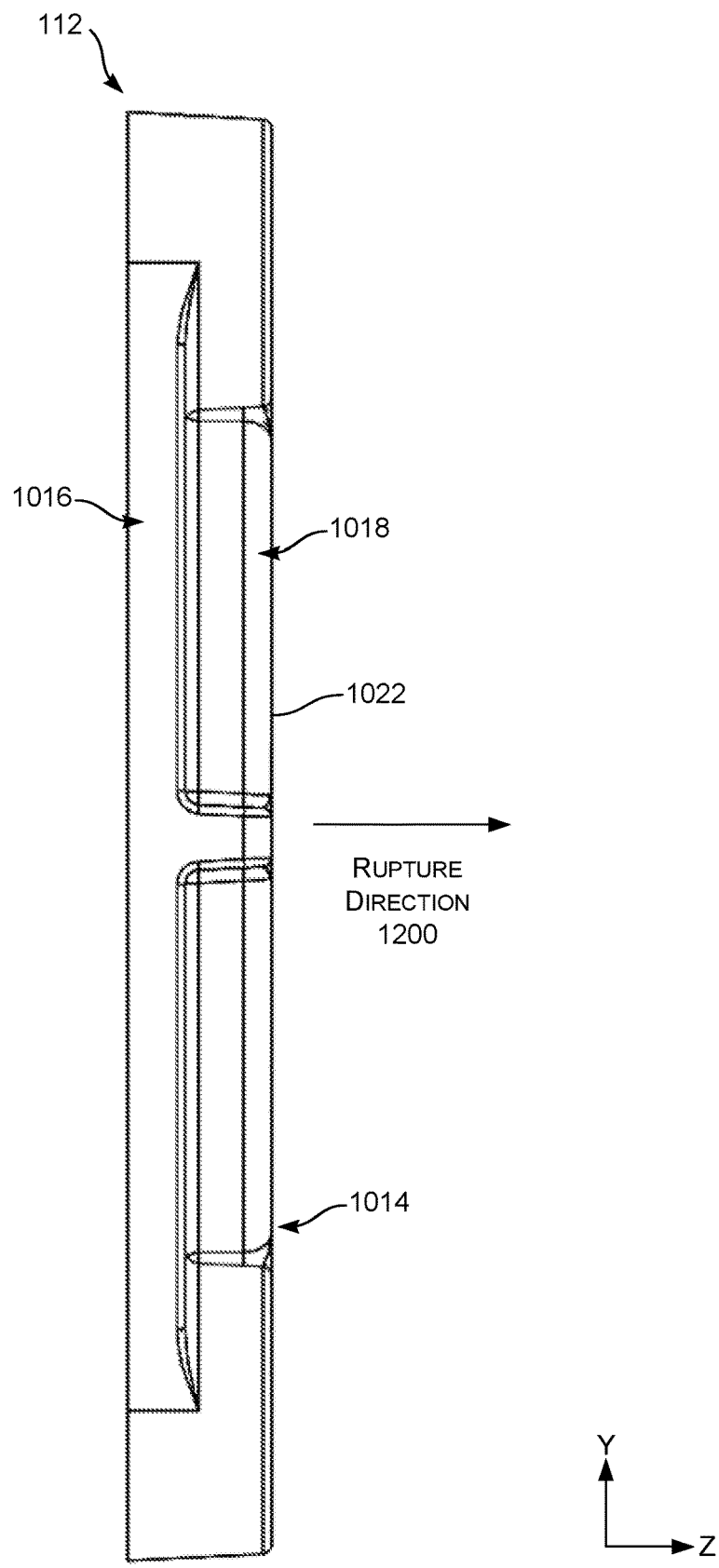
FIG. 12 illustrates a first side view of the pressure release vent of the battery module of FIG. 1, according to an example of the present disclosure.

FIG. 12 illustrates a side view of the pressure release vent 112. As illustrated, the protruded portion 1018 extends in a direction away from the flange portion 1016 for providing the pocket 1102 within the pressure release vent 112. When a pressure of the battery module 100 exceeds the pressure threshold, the region 1022 is configured to rupture outward, away from the battery module 100, in a rupture direction 1200. The region 1022 is disposed on the exterior surface 1014, opposite to where the sections 1106 are located on the interior surface 1100. As such, following rupture, the pressure within the battery module 100 is vented out the pressure release vent 112.

Figure 13:
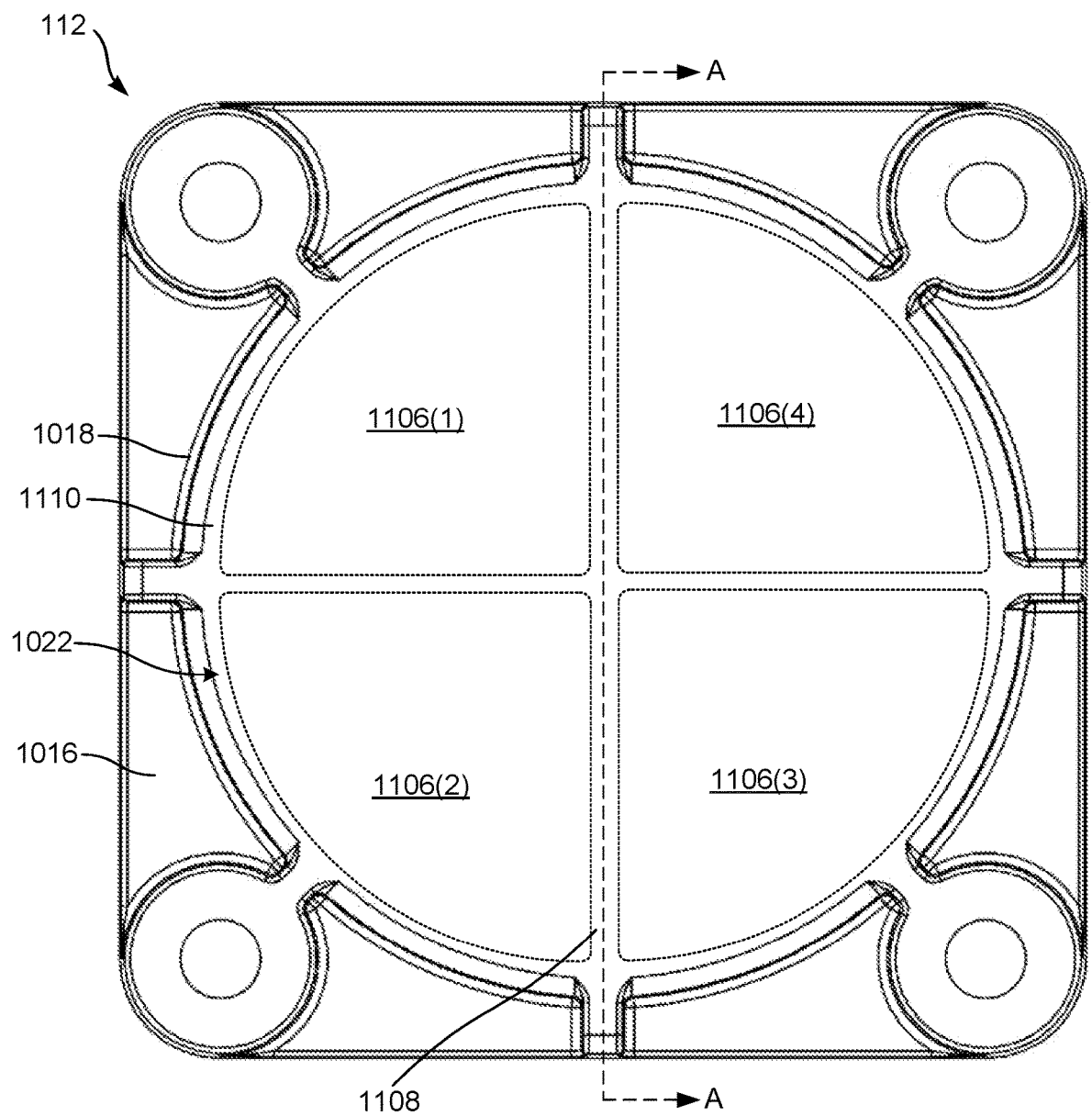
FIG. 13 illustrates a second side view of the pressure release vent of the battery module of FIG. 1, according to an example of the present disclosure.

FIG. 13 illustrates a front view of the pressure release vent 112. The flange portion 1016 may be substantially square in shape, while the protruded portion 1018 (and the region 1022), may be substantially circular in shape. However, although particular shapes are shown, other shapes are envisioned. In such instances, the sections 1106 of the pocket 1102 may be differently shaped as well, and/or divided into a different number of portions.

As also shown in FIG. 13, the sections 1106 are shown in dashed lines to indicate their position on the interior surface 1100, opposite the exterior surface 1014 and the region 1022. Further, the first trough 1108 is shown extending between the sections 1106, and the second trough 1110 is shown extending around the sections 1106.

FIG. 14 illustrates a rear view of the pressure release vent 112. The sections 1106 are shown disposed on the interior surface 1100 of the pocket 1102. Each of the sections 1106 may be similar in size and shape. The sections 1106 each couple to the sidewall 1104 via a segment. Stated alternatively, the segments may span from the sidewall 1104 to the sections 1106. For example, the first section 1106(1) may couple to the sidewall 1104 via a first segment 1400(1), the second section 1106(2) may couple to the sidewall 1104 via a second segment 1400(2), the third section 1106(3) may couple to the sidewall 1104 via a third segment 1400(3), the fourth section 1106(4) may couple to the sidewall 1104 via a fourth segment 1400(4). During rupture of the pressure release vent 112, each of the sections 1106 may respectively pivot about the segment 1400. In this manner, the segments 1400 act as hinges.

The first trough 1108 is shown being disposed between, or bisecting, the sections 1106. In some instances, the first trough 1108 is formed within the interior surface 1100 in multiple directions. For example, the first trough 1108 may be formed within the interior surface 1100, in a first direction (e.g., laterally in the X-direction) and a second direction (e.g., longitudinally in the Y-direction). As introduced above, and as will be shown in greater detail with regard to FIG. 17, the first trough 1108 includes a thickness that is less than a thickness of the sections 1106 (between the exterior surface 1014 and the interior surface 1100). In doing so, during rupture, the first trough 1108 is configured to fail such that the sections 1106 are opened outwards and pivot about the segments 1400, respectively. Additionally, as introduced above, and as will be shown in greater detail with regard to FIG. 17, the second trough 1110 includes a thickness that is less than a thickness of the sections 1106. During rupture, the second trough 1110 permits the sections 1106 to pivot about the segments 1400, respectively.

In some instances, the segments 1400 intersect the second trough 1110 such that the second trough 1110 may not be continuous around the exterior of the sections 1106. In this manner, the second trough 1110 extends between the first segment 1400(1) and the second segment 1400(2), between the second segment 1400(2) and the third segment 1400(3), between the third segment 1400(3) and the fourth segment 1400(4), and between the fourth segment 1400(4) and the first segment 1400(1).

In some instances, the segments 1400 are diametrically opposed from one another, respectively, around a perimeter of the pocket 1102. The segments 1400 may also be located centrally on the sections 1106. For example, the first segment 1400(1) may be centrally located between sides of the first section 1106(1) (e.g., in the Y-direction). In some instances, each of the sections 1106 may be coupled to the sidewall 1104 by more than one segment. For example, two segments may couple the sections 1106 to the sidewall 1104.

The first trough 1108 is shown being formed internal to the second trough 1110 and/or the sections 1106. The second trough 1110 circumferentially extends around the sections 1106. In some instances, the first trough 1108 and the second trough 1110 are adjoined (e.g., connected) at certain locations, so as to represent a single, unitary, trough. The sections 1106 may represent raised platforms, areas, sectors that are above (e.g., in the Z-direction) the first trough 1108 and the second trough 1110. In some instances, the second trough 1110 includes a diameter 1402 that is disposed around the sections 1106. In some instances, the diameter 1402 represents a diameter of the region 1022 as well. However, in instances where the region 1022, the sections 1106, and/or the pocket 1102 include different shapes, the diameter 1402 may represent a cross-sectional size.

In some instances, a size of the pocket 1102 (e.g., X-direction) and/or the region 1022 (e.g., the diameter 1402) is based at least in part on a designed pressure threshold at which the pressure release vent 112 is configured to rupture. For example, changing a size of the pocket 1102 may correspondingly change a surface area of the pocket 1102 that is exposed to the internal pressure within the battery module 100. In some instances, increasing the surface area, for example, decreases an amount of pressure required to rupture the pressure release vent 112, while decreasing the surface area increases an amount of pressure required to rupture the pressure release vent 112. Moreover, in some instances, a size number, and/or shape of the sections 1106 may impact the amount of pressure required for rupturing. Still, as will also be discussed herein in FIGS. 16 and 17, a size (e.g., width, thickness, etc.) of the first trough 1108 and/or the second trough 1110 may impact the amount of pressure required for rupture.

As such, during rupture of the pressure release vent 112, the sections 1106 are configured to pivot about the segments 1400. This pivotable movement opens the sections 1106 in an outward motion and away from the battery module 100. Thereafter, the segments 1400 themselves break and the sections 1106 dislodge from the pressure release vent 112. However, the initial pivotable movement about the segments 1400 ensures that the sections 1106 move in the outward direction and away from the battery module 100. Such movement may also come by way of the first trough 1108 and the second trough 1110 including a thickness that is less than a thickness of the sections 1106.

Figure 15:
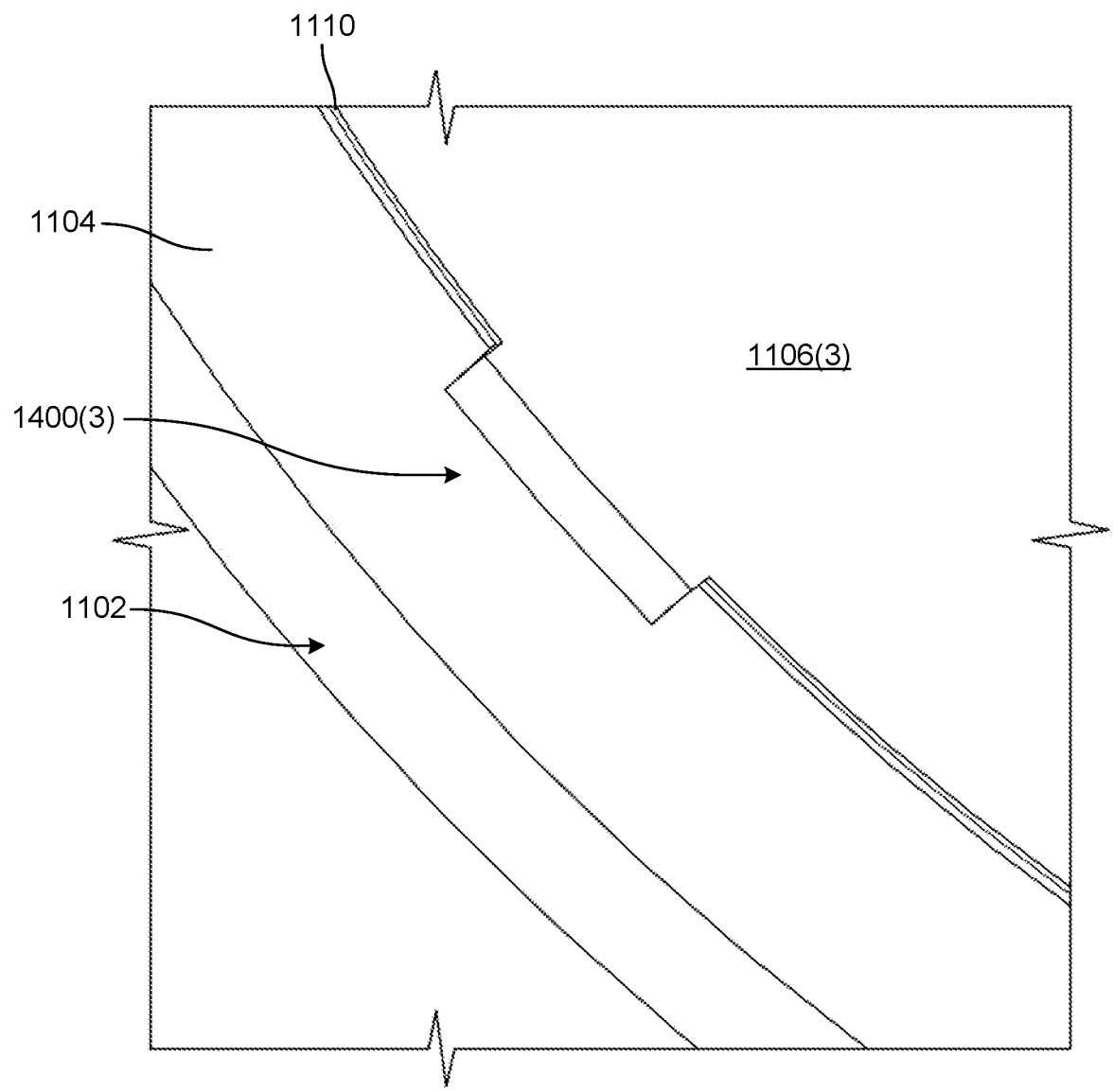
FIG. 15 illustrates a detailed view a portion of the pressure release vent of the battery module of FIG. 1, showing an example segment of the pressure release vent that acts as a hinge, according to an example of the present disclosure.

FIG. 15 illustrates a detailed view of the third segment 1400(3). Although the discussion herein relates to an operation and/or function of the third segment 1400(3), the operation and/or function of the first segment 1400(1), the second segment 1400(2), and the fourth segment 1400(4) may be similar.

The third segment 1400(3) is shown extending from the third section 1106(3) to the sidewall 1104. In such instances, the third segment 1400(3) couples the third section 1106(3) to the sidewall 1104. The second trough 1110 is shown being disposed on both sides of the third segment 1400(3). During rupture of the pressure release vent 112, the first trough 1108 and the second trough 1110 breach such that the third section 1106(3) is permitted to pivot about the third segment 1400 (3). More particularly, the third segment 1400(3) includes a thickness that is greater than the first trough 1108 and the second trough 1110. In doing so, when the internal pressure of the battery module 100 exceeds the pressure threshold, and ruptures the pressure release vent 112, initially, the first trough 1108 and the second trough 1110 fail (or portions thereof). Being as the segments 1400 include a greater thickness than the first trough 1108 and the second trough 1110, following rupture of the pressure release vent 112, the sections 1106 remain coupled to the sidewall 1104 via the segments 1400, respectively. In some instances, the sections 1106 decouple or break away from the sidewall 1104 following the rupture, however, after the portions of the region 1022 corresponding to the first trough 1108 and the second trough 1110 break.

That is, such decoupling is designed to occur after the areas of the region 1022 corresponding to the first trough 1108 and the second trough 1110 fail. The initial break of the region 1022 corresponding to the first trough 1108 and the second trough 1110 advance the sections 1106 outward in the rupture direction 1200. Therein, the sections 1106 pivot about the segments 1400, respectively, in an outward motion. However, after this initial movement, the sections 1106 and/or the segments 1400 break away, deform, and so forth. As such, the segments 1400 permit the sections 1106 to rupture in a controlled manner by pivoting outward.

Figure 16:
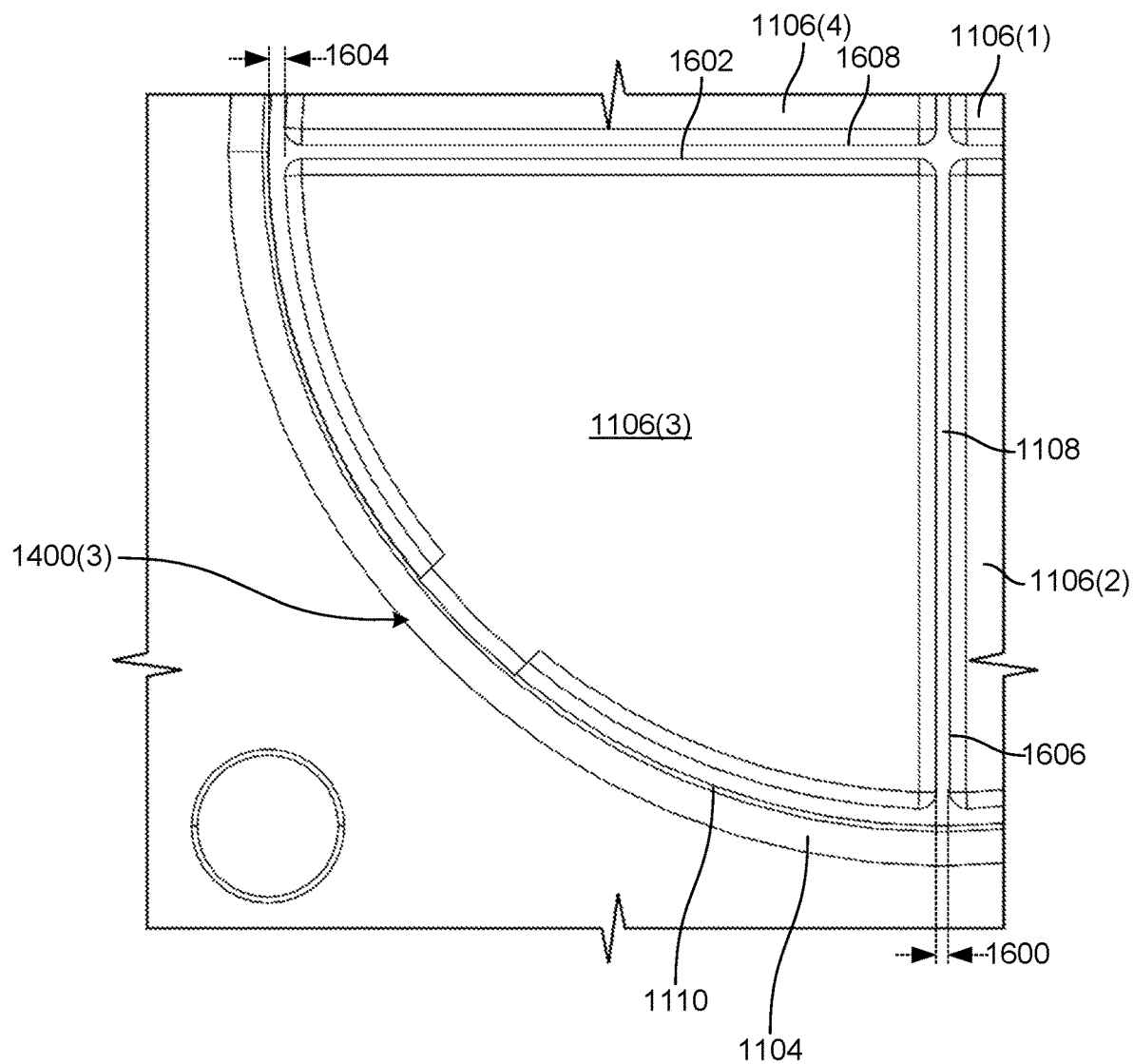
FIG. 16 illustrates a partial view of the pressure release vent of the battery module of FIG. 1, according to an example of the present disclosure.

FIG. 16 illustrates a detailed view of a portion of the pocket 1102, showing as the third section 1106(3), the first trough 1108, and the second trough 1110. The first trough 1108 includes a first width 1600. The first width 1600 represents distance interposed between (or separating) the third section 1106(3) and the second section 1106(2), as well as the third section 1106(3) and the fourth section 1106(4). For example, the first width 1600 represents a distance that spans from a perimeter 1602 of the third section 1106(3), to a perimeter 1606 of the second section 1106(2), a distance that spans from the perimeter 1602 of the third section 1106(3) to a perimeter 1608 of the fourth section 1106(4). The first width 1600 may also represent a distance interposed between the first section 1106(1) and the second section 1106(2), as well as the first section 1106(1) and the fourth section 1106(4). In some instances, the first width 1600 ranges from approximately 0.2 millimeter (mm) to approximately one mm. However, other widths are envisioned, and in some instances, the first width 1600 may be configured to adjust the pressure threshold required to rupture the pressure release vent 112. For example, making the first width 1600 greater may reduce an amount of pressure required to rupture the first trough.

Additionally, the second trough 1110 includes a second width 1604. The second width 1604 represent distance interposed between (or separating) the third section 1106(3) and the sidewall 1104. For example, the second width 1604 may represent a distance that spans from the perimeter 1602 of the third section 1106(3) to the sidewall 1104. The second width 1604 may also represent a distance interposed between the first section 1106(1) and the sidewall 1104, the second section 1106(2) and the sidewall 1104, and/or the fourth section 1106(4) and the sidewall 1104.

In some instances, the second width 1604 is the same as or different than the first width 1600. For example, in some instances, the second width 1604 ranges from approximately 0.25 mm to approximately 1.25 mm. However, other widths are envisioned, and in some instances, the second width 1604 may be configured to adjust the pressure threshold required to rupture the pressure release vent 112.

In some instances, the third segment 1400(3) is centrally located along an arc length of the perimeter 1602 that is adjacent to the sidewall 1104. In this manner, the third section 1106(3) may be balanced (e.g., weight) about the third segment 1400(3). In some instances, more than one segment may couple the third section 1106(3) to the sidewall 1104.

The first trough 1108 and the second trough 1110 therefore include the first width 1600 and the second width 1604, respectively, that assist in a rupturing of the pressure release vent 112 when the internal pressure of the battery module 100 exceeds a pressure threshold. Additionally, although the first trough 1108 and the second trough 1110 are shown including certain shapes, parts, or portions, the first trough 1108 and/or the second trough 1110 may include different shapes.

Figure 17:
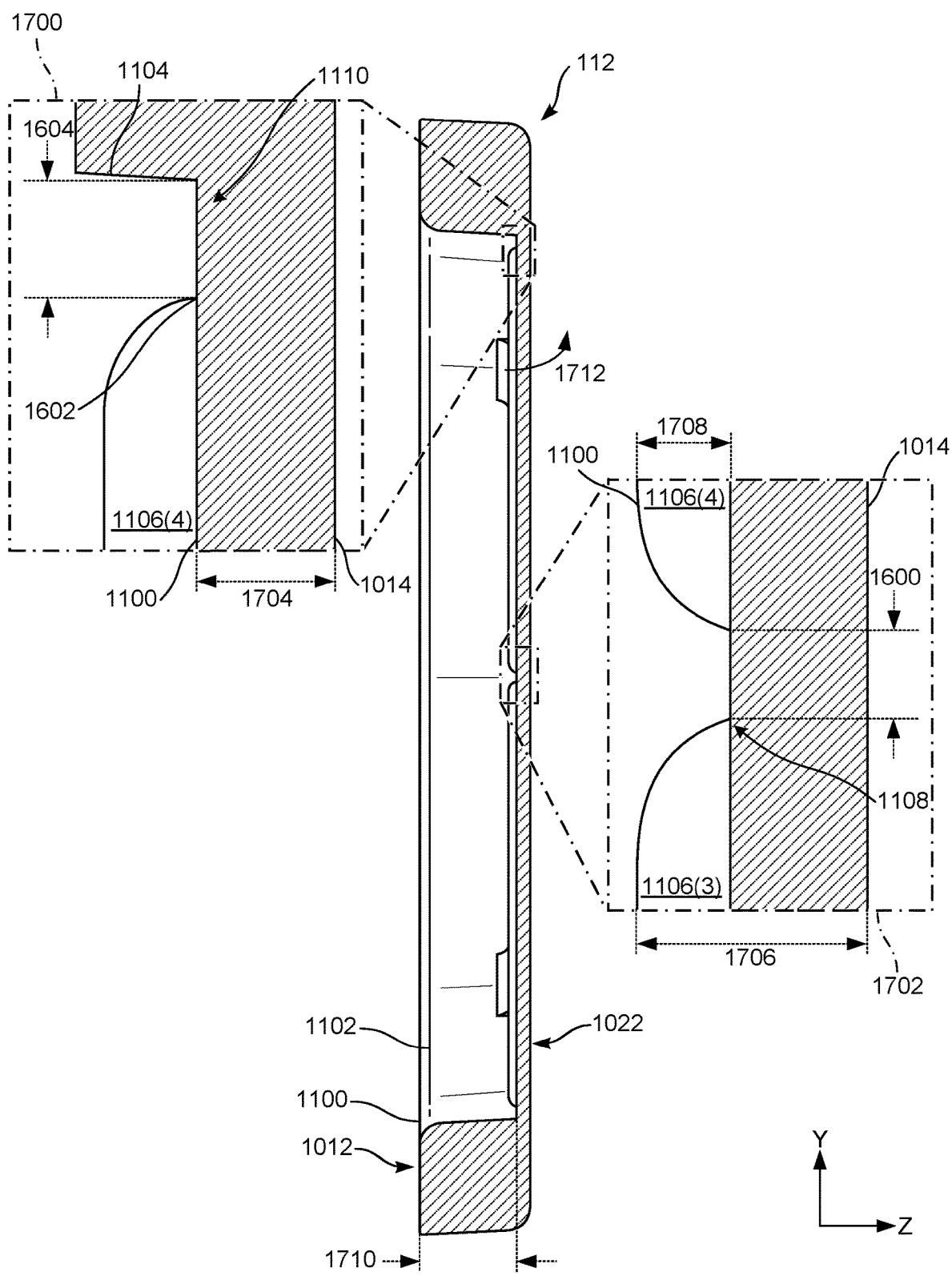
FIG. 17 illustrates a cross-sectional view of the pressure release vent of the battery module of FIG. 1, according to an example of the present disclosure.

FIG. 17 illustrates a cross-sectional view of the pressure release vent 112. FIG. 17 illustrates detailed views of the pressure release vent 112, such as a first detailed view 1700 and a second detailed view 1702. In the first detailed view 1700, the second trough 1110 is shown including the second width 1604. In the first detailed view 1700, the second width 1604 spans between the perimeter 1602 of the fourth section 1106(4) and the sidewall 1104.

As shown in the first detailed view 1700, the pressure release vent 112 includes a first thickness 1704 (e.g., in the Z-direction) that spans between the exterior surface 1014 and the interior surface 1100. For example, the first thickness 1704 represents a distance that extends from the interior surface 1100, at the first trough 1108 and/or the second trough 1110, to the exterior surface 1014. As such, the first thickness 1704 may not represent or take into consideration a thickness of the sections 1106 (e.g., in the Z-direction). In some instances, the first thickness 1704 ranges between approximately 0.2 mm to approximately one mm.

In some instances, the first thickness 1704 may resist breakage of the pressure release vent 112 prior to rupture of the pressure release vent 112. For example, during shipping, installation, maintenance, and so forth, the first thickness 1704 may resist impact from tools breaking portions of the pressure release vent 112 corresponding to the first trough 1108 and/or the second trough 1110. As such, the pressure release vent 112 may be gas-impermeable.

Additionally, as shown in the second detailed view 1702, the pressure release vent 112 includes a second thickness 1706 (e.g., in the Z-direction) that spans between the exterior surface 1014 and the interior surface 1100. For example, the second thickness 1706 may represent a distance that extends from the interior surface 1100, at the sections 1106, to the exterior surface 1014. As such, the second thickness 1706 represents or takes into consideration a thickness of the sections 1106 (e.g., in the Z-direction). In some instances, the second thickness 1706 ranges between approximately 0.25 mm to approximately 5 mm. The second thickness 1706 is therefore greater than the first thickness, such that the first trough 1108 and the second trough 1110 break upon the pressure within the battery module 100 exceeding the pressure threshold. That is, because the second thickness 1706 is greater than the first thickness 1704, the pressure release vent 112 may not initially fail at a location corresponding to the sections 1106.

A third thickness 1708 is further shown in the second detailed view 1702. In some instances, the third thickness 1708 spans between a location on the interior surface 1100 within the first trough 1108 or the second trough 1110, to a location on the interior surface 1100 atop the sections 1106. In some instances, the third thickness 1708 ranges between approximately five mm to approximately eight mm. The first thickness 1704 and the third thickness 1708 collectively make up the second thickness 1706.

In some instances, the first thickness 1704 that extends from the exterior surface 1014 to a location within the second trough 1110 is greater than a thickness that extends from the exterior surface 1014 to a location within the first trough 1108. In doing so, upon rupture of the pressure release vent 112, the first trough 1108 may rupture first and may then be followed by rupture of the second trough 1110. As such, the first trough 1108 and the second trough 1110 may not include the same thickness (in the Z-direction).

The sidewall 1104 (or more generally, the pocket 1102) further includes a depth 1710 that spans between the back 1012 to a location within the second trough 1110. In some instances, the depth 1710 may be configured to assist in relieving the internal pressure within the battery module 100 by directing gases out the pressure release vent 112 during rupture. In some instances, the depth 1710 ranges between approximately 0.05 mm and approximately 4 mm.

As also shown in FIG. 17, the segments 1400 are configured to move in a swinging direction 1712. For example, the fourth segment 1400(4) swings outward during rupture, away from the battery module 100 (e.g., X-direction and/or Z-direction). As such, the fourth segment 1400(4), for example, permits the fourth section 1106(4) to pivot about the sidewall 1104 during rupture of the pressure release vent 112.

The pressure release vent 112 therefore includes different thicknesses that assist in the rupture of the pressure release vent 112. For example, the first thickness 1704 of the pressure release vent 112 is less than the second thickness 1706 of the pressure release vent 112, such that the pressure release vent 112 may initially break at the first trough 1108 and/or the second trough 1110. In doing so, the sections 1106 of the pressure release vent 112 may pivot about the segments 1400 to open and relieve the internal pressure within the battery module 100.

INDUSTRIAL APPLICABILITY

The present disclosure describes a pressure release vent that safely discharges an internal pressure of a battery module in the event of a failure of one or more battery cell(s) within the battery module. The pressure release vent described herein couples to a housing that confines the battery cells within the battery module. The pressure release vent is configured to rupture in the event that a pressure within the battery module exceeds a threshold pressure. For example, during a failure of one or more of the battery cell(s) and/or during a thermal runaway of the battery module, the pressure release vent may rupture. In some instances, a plate within the battery module is disposed overhead of the battery cells to create a flow path that directs gases and/or other fluids released from the battery cells in a direction towards the pressure release vent. Releasing the internal pressure from the battery module via the pressure release vent may safely discharge the internal pressure at a designed location and avoid explosions that may damage components surrounding the battery module and/or other harmful effects.

The pressure release vent, more specifically, may include thinned sections that are designed to break, rip, or otherwise fail first. For example, the thinned sections, such as troughs, may represent a weak point in the pressure release vent. When the pressure within the battery module exceeds the threshold pressure, the troughs may break. The sections, themselves, however, may remain coupled to the pressure release vent via segments, respectively. The segments may assist in controlling a movement, or assisting a movement of the sections, outward and away from the battery module. As the sections open and pivot about the segments, the internal pressure within the battery module is relieved. Thereafter, in some instances, the sections themselves may dislodge from the pressure release vent and the segments may break. However, such dislodging may occur after the sections may been directed outward and away from pressure release vent.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A battery module, comprising:
    a housing including:
        a first end plate defining a first end of the battery module, the first end plate having a passage,
        a second end plate defining a second end of the battery module opposite the first end,
        a first side plate coupled to the first end plate and the second end plate, and
        a second side plate opposite the first side plate, the second side plate being coupled to the first end plate and the second end plate;
    a plurality of battery cells secured within the housing between the first end plate, the second end plate, the first side plate, and the second side plate;
    a cover surrounding the plurality of battery cells, the cover forming a first substantially fluid-tight seal with the first end plate and a second substantially fluid-tight seal with the second end plate; and
    a gas-impermeable pressure release vent coupled to the first end plate and forming a third substantially fluid-tight seal with the first end plate, the gas-impermeable pressure release vent including a body having a pocket substantially overlaying the passage, the pocket of the body including:
        a first portion having a first thickness, and an inner surface facing the passage when the pressure release vent is coupled to the first end plate,
        a second portion adjacent to the first portion, the second portion having a second thickness less than the first thickness, and
        a segment extending from the inner surface of the first portion, the segment having a segment thickness greater than the first thickness.

2. The battery module of claim 1, wherein the body further includes:

a plurality of sections defined by the first portion; and
an annular sidewall; wherein:
   the segment comprises a first segment of a plurality of segments, and
   each segment of the plurality of segments extends from a respective section of the plurality of sections to the sidewall.

3. The battery module of claim 2, wherein:
the second portion comprises:
   a first trough that separates the individual sections of the plurality of sections, and
   a second trough that is disposed around the plurality of sections and adjacent to the sidewall,
the first segment comprises:
   a first side extending radially from the sidewall to a first section of the plurality of sections, and
   a second side extending radially from the sidewall to the first section, and
the second trough is disposed adjacent to the first and second sides of the first segment.

4. The battery module of claim 2, wherein:
the body includes an exterior surface opposite the inner surface;
the exterior surface includes a substantially flat region; and
each segment of the plurality of segments is located centrally on a respective section of the plurality of sections.

5. The battery module of claim 2, wherein the first segment is coupled to a first section of the plurality of sections, the first segment being configured to:
   direct the first section to pivot about the first segment during rupture of the pressure release vent, and
   maintain a coupling between the first section and the sidewall following rupture of the pressure release vent.

6. The battery module of claim 1, further comprising:
a top plate disposed within a gap defined between a first top of the first end plate, a second top of the second end plate, and a top of the battery cells, and
a tab extending above the top of the battery cells and through an aperture of the top plate, the tab engaging an inner surface of the cover facing the top plate, wherein
   the top plate is disposed between the cover and the top of the battery cells, and
   the top plate at least partially defines a flow path from the top of the battery cells to the gas-impermeable pressure release vent.

\* \* \* \* \*